(12) United States Patent
Saita

(10) Patent No.: US 10,847,990 B2
(45) Date of Patent: Nov. 24, 2020

(54) NON-CONTACT POWER TRANSMISSION SYSTEM

(71) Applicant: HONDA MOTOR CO., LTD., Tokyo (JP)

(72) Inventor: Akira Saita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 338 days.

(21) Appl. No.: 15/939,472

(22) Filed: Mar. 29, 2018

(65) Prior Publication Data

US 2018/0287415 A1 Oct. 4, 2018

(30) Foreign Application Priority Data

Mar. 31, 2017 (JP) ................. 2017-073245

(51) Int. Cl.
*H02J 50/90* (2016.01)
*H02J 7/02* (2016.01)
(Continued)

(52) U.S. Cl.
CPC .............. *H02J 7/025* (2013.01); *B60L 53/12* (2019.02); *B60L 53/39* (2019.02); *H02J 7/0027* (2013.01);
(Continued)

(58) Field of Classification Search
CPC .... B60L 11/1829; B60L 53/38; B60L 11/182; B60L 11/1831; B60L 53/12; B60L 53/60; H02J 50/00; H02J 50/90; H02J 50/10; H02J 50/12; H02J 7/007; H02J 7/025; H02J 17/00; H02J 50/001; H02J 50/005; H02J 50/05; H02J 50/20; H02J 50/15; H02J 50/23; H02J 50/27; H02J 50/30; H02J 50/40; H02J 50/402; H02J 50/50; H02J 50/502; H02J 50/60; H02J 50/70;
(Continued)

(56) References Cited

U.S. PATENT DOCUMENTS 10,082,748 B2 * 9/2018 Kitamura ............. G03G 15/161
10,097,046 B2 * 10/2018 Plekhanov ........... H01Q 21/061
(Continued)

FOREIGN PATENT DOCUMENTS

JP 2008-074321 4/2008
JP 2012-208599 10/2012
(Continued)

OTHER PUBLICATIONS

Japanese Office Action for Japanese Patent Application No. 2017-073245 dated Sep. 25, 2018.

*Primary Examiner* — M Baye Diao
(74) *Attorney, Agent, or Firm* — Amin, Turocy & Watson, LLP

(57) ABSTRACT

In a non-contact power transmission system, the radial distance of a power reception coil relative to a power transmission coil is detected on the basis of the weak voltage value corresponding to the amount of weak power received by the power reception coil, and moreover the moving amount is detected on the basis of the change in level of the detected weak voltage value and furthermore, the moving direction is detected. Thus, the position (distance) of the power reception coil relative to the power transmission coil is detected.

10 Claims, 18 Drawing Sheets

(51) Int. Cl.
*H02J 7/00* (2006.01)
*H02J 50/10* (2016.01)
*B60L 53/39* (2019.01)
*B60L 53/12* (2019.01)
*B60L 53/37* (2019.01)

(52) U.S. Cl.
CPC .............. *H02J 50/10* (2016.02); *H02J 50/90* (2016.02); *B60L 53/37* (2019.02); *B60L 2250/16* (2013.01); *Y02T 10/70* (2013.01)

(58) Field of Classification Search
CPC .. H02J 50/80; H02J 7/00; H02J 7/0042; H02J 7/0044; H02J 7/0045; Y02T 10/7005; Y02T 10/7088; Y02T 90/122; H04B 5/00; H04B 5/0075; H04B 5/0093; H04B 5/0037; H04B 5/0031; H01F 38/14; A61N 1/3787
USPC .................................................. 320/109, 108
See application file for complete search history.

(56) References Cited

U.S. PATENT DOCUMENTS

| | | | |
|---|---|---|---|
| 10,418,857 B2* | 9/2019 | Kim | H02M 7/539 |
| 10,541,551 B2* | 1/2020 | Saita | H02J 7/0027 |
| 2009/0322503 A1 | 12/2009 | Suzuki et al. | |
| 2012/0313577 A1* | 12/2012 | Moes | H02J 50/402 |
| | | | 320/108 |
| 2015/0217648 A1 | 8/2015 | Ichikawa et al. | |
| 2017/0001532 A1 | 1/2017 | Taniguchi | |
| 2017/0129358 A1 | 5/2017 | Taniguchi | |
| 2018/0015837 A1 | 1/2018 | Tsukamoto | |
| 2018/0219428 A1* | 8/2018 | Bae | H02J 50/90 |

FOREIGN PATENT DOCUMENTS

| | | |
|---|---|---|
| JP | 2015-126658 | 7/2015 |
| JP | 5937631 | 8/2015 |
| JP | 2015-201914 | 11/2015 |
| JP | 2017-028953 | 2/2017 |
| WO | 2016/121022 | 8/2016 |

* cited by examiner $\begin{bmatrix} x=0, y=0 \\ vlpe=vlpemax \end{bmatrix}$ (x=0, y=ya)

(x<xc, y=0)

Sp=R

Sp=R

NON-CONTACT POWER TRANSMISSION SYSTEM

CROSS-REFERENCE TO RELATED APPLICATION

This application is based upon and claims the benefit of priority from Japanese Patent Application No. 2017-073245 filed on Mar. 31, 2017, the contents of which are incorporated herein by reference.

BACKGROUND OF THE INVENTION

Field of the Invention

The present invention relates to a non-contact power transmission system that positions a vehicle including an energy storage device with respect to a charging station.

Description of the Related Art

In this type of non-contact power transmission system, the vehicle is positioned at the charging station and then main charging of the energy storage device of the vehicle is performed with a steady power (normal power) transmitted from the charging station.

The positioning is performed before the main charging, and in this positioning, a weak power for positioning is transmitted from the charging station from the viewpoints of power saving, electromagnetic interface (EMI) suppression, and the like.

The vehicle having received the weak power travels for positioning on the basis of the weak power so as to be positioned at the charging station.

The vehicle having been positioned performs the main charging of the energy storage device of the vehicle without contact, with the steady power that is large and is switched from the weak power at the position of the charging station.

For example, Japanese Patent No. 5937631 (hereinafter referred to as JP 5937631 B) discloses a non-contact power transmission system that transmits a weak power from a power transmission unit of a charging station having received a power transmission request signal from a vehicle and at the time of a start of a detection of the weak power in a power reception unit of the vehicle, performs positioning at the charging station (power transmission unit) on the basis of the intensity of the weak power (power reception voltage) ([0029]) in JP 5937631 B).

SUMMARY OF THE INVENTION

According to JP 5937631 B, a distance detection unit detects a distance between the power transmission unit and the power reception unit on the basis of the power reception voltage generated at opposite ends of a resistor by the weak power ([0039], [0040], FIG. 1, and FIG. 2 in JP 5937631 B).

In addition, JP 5937631 B discloses that when the level of the power reception voltage exceeds a threshold, a display unit is notified of a successful completion of positioning, the positioning is terminated, the transmission of the weak power is stopped, and the transmission power is increased to perform the main charging ([0089], [0090], [0097] in JP 5937631 B).

However, when the distance between the power transmission unit and the power reception unit is simply detected, for example, the power transmission unit and the power reception unit may be displayed inversely in an in-vehicle display unit, and in this case, an occupant such as a driver feels a sense of discomfort.

In addition, when the level of the power reception voltage exceeds the threshold, positioning is terminated and then, the main charging is performed. In this case, it is highly likely that the power reception efficiency (reception power/transmission power) in the main charging is not optimal and the power is wasted. In the practical application, it has been demonstrated that the power reception efficiency deteriorates by 20% or more if a center of the power reception unit and a center of the power transmission unit are shifted by several centimeters.

The present invention has been made in view of the above, and an object is to provide a non-contact power transmission system that can accurately detect a position (distance) of the power reception unit relative to the power transmission unit.

Another object of the present invention is to provide the non-contact power transmission system that can optimize the charging efficiency for an energy storage device of a vehicle.

A non-contact power transmission system according to the present invention includes a charging station with a power transmission unit configured to transmit a weak power, and a vehicle including a power reception unit configured to receive the weak power without contact, a control unit of the vehicle including: a voltage value detection unit configured to detect a weak voltage value of the weak power received by the power reception unit; a moving amount detection unit configured to detect a moving amount of the vehicle; and a moving direction detection unit configured to detect a moving direction of the vehicle, wherein a position of the power reception unit relative to the power transmission unit is detected on a basis of the weak voltage value, the moving amount, and the moving direction that are detected.

According to the present invention, on the basis of the detected weak voltage value, a distance (radial distance) from the power transmission unit to the power reception unit is detected, and moreover the moving amount and the moving direction of the vehicle are detected. Thus, a two-dimensional relative position of the power reception unit to the power transmission unit can be accurately detected.

In this case, the control unit of the vehicle may further include a significance determination unit configured to determine whether the weak voltage value detected by the voltage value detection unit is significant, and an initial position/parameter setting unit, wherein: when the voltage value detected by the voltage value detection unit has increased from zero while the vehicle travels toward the power transmission unit in order to detect the weak power, the significance determination unit may be configured to determine that the weak voltage value is significant; and the initial position/parameter setting unit may be configured to set a position at which it is determined that the weak voltage value is significant as an initial position of the power reception unit, and reset a parameter.

According to the present invention, the distance from the power transmission unit where the weak voltage value becomes significant is obtained in advance relative to the power reception unit with a predetermined height (distance between power transmission unit and power reception unit when centers coincide with each other in plan view) and a predetermined shape; therefore, when the weak voltage value is detected, the detected position is set to an initial position of the power reception unit and the parameter is reset (set to zero). After that, the vehicle is driven toward the center of the power transmission unit by a known distance so that the power reception unit is moved; thus, the vehicle can be positioned accurately at a position where the power reception efficiency of the main charging is the optimum (position where the center of the power reception unit coincides with the center of the power transmission unit in plan view).

In other words, the distance to the power transmission unit is shortened while the position of the power reception unit relative to the power transmission unit is known, so that positioning can be performed certainly.

The control unit of the vehicle may further include: a significance determination unit configured to determine whether the weak voltage value detected by the voltage value detection unit is significant; an initial position determining differentiation unit configured to obtain a differential value of the weak voltage value detected by the voltage value detection unit; and an initial position/parameter setting unit, wherein: the significance determination unit may be configured to determine that the weak voltage value is significant when a differential value of the voltage value detected by the voltage value detection unit, which is obtained by the initial position determining differentiation unit, has increased from zero while the vehicle travels toward the power transmission unit in order to detect the weak power; and the initial position/parameter setting unit may be configured to set a position at which it is determined that the weak voltage value is significant as an initial position of the power reception unit, and reset a parameter.

Even in this case, the distance from the power transmission unit where the weak voltage value becomes significant is obtained in advance relative to the power reception unit with the predetermined height (distance between power transmission unit and power reception unit when centers coincide with each other in plan view) and the predetermined shape; therefore, when an initial position determining differential value of the voltage value has increased from zero, the detected position is set to the initial position of the power reception unit and the parameter is reset because it is regarded that the weak voltage value is detected. After that, the vehicle is driven toward the center of the power transmission unit by a known distance so that the power reception unit is moved; thus, the vehicle can be positioned accurately at a position where the power reception efficiency of the main charging is the optimum (position where the center of the power reception unit coincides with the center of the power transmission unit in plan view).

In other words, the distance to the power transmission unit is shortened while the position of the power reception unit relative to the power transmission unit is known, so that positioning can be performed certainly.

Note that if the differential value is a time differential value, the significance can be determined and the initial position can be set during the travel, and if the differential value is a position differential value, the significance can be determined and the initial position can be set regardless of vehicle speed.

In this case, the control unit may further include a voltage value characteristic storage unit configured to store in advance a weak voltage value characteristic expressing a correspondence relation between the weak voltage value and a distance from the power transmission unit to the power reception unit, wherein the moving amount detection unit may be configured to detect the distance from the power transmission unit to the power reception unit by detecting the moving amount from the initial position to the power reception unit with reference to the weak voltage value characteristic using the weak voltage value detected by the voltage value detection unit as an argument.

According to the present invention, the weak voltage value characteristic is referred to by using the detected weak voltage value as an argument, and thus, the distance from the power transmission unit to the power reception unit is detected. Therefore, the accurate position (distance) of the power reception unit relative to the power transmission unit can be obtained.

In the weak voltage value characteristic, the weak voltage value becomes a maximum value when the position of the power reception unit coincides with the position of the power transmission unit; therefore, by stopping the vehicle when the maximum value is detected, positioning can be terminated at the position where the power reception efficiency of the main charging is the optimum (maximum).

The control unit may further include: a weak voltage integrated value calculation unit configured to calculate a weak voltage integrated value corresponding to an integrated value of the weak voltage value that is detected; and a voltage integrated value characteristic storage unit configured to store in advance a weak voltage integrated value characteristic expressing a correspondence relation between the weak voltage integrated value and the distance from the power transmission unit to the power reception unit, wherein the distance from the power transmission unit to the power reception unit may be detected by detecting the moving amount from the initial position with reference to the weak voltage integrated value characteristic.

According to the present invention, even if there is a place (position) in a route of a straight road connecting between the initial position and the power transmission unit where the electromagnetic coupling degree between the power transmission unit and the power reception unit increases or decreases, the weak voltage integrated value monotonically increases because the weak voltage value is a positive value. Therefore, by detecting the moving amount from the initial position with reference to the weak voltage integrated value characteristic, the distance from the power transmission unit to the power reception unit can be detected certainly.

The control unit may further include: a weak voltage integrated value calculation unit configured to calculate a weak voltage integrated value corresponding to an integrated value of the weak voltage value that is detected; and a voltage integrated value characteristic storage unit configured to store in advance a weak voltage integrated value characteristic expressing a correspondence relation between the weak voltage integrated value and the distance from the power transmission unit to the power reception unit, wherein in a very-close-distance region of the power transmission unit where the weak voltage value increases as the moving amount increases, the distance from the power transmission unit may be calculated with reference to the weak voltage value characteristic, and in a separation distance region that is farther than the very-close-distance region and that includes a region where the weak voltage value does not increase although the moving amount increases, the distance from the power transmission unit may be calculated with reference to the weak voltage integrated value characteristic.

In a region where the weak voltage value in the weak voltage value characteristic does not increase although the distance between the power transmission unit and the power reception unit becomes shorter, the distance to the power reception unit can be detected with reference to the weak voltage integrated value characteristic obtained by integrating the weak voltage value characteristic; thus, the distance from the power transmission unit to the power reception unit can be detected with high robustness.

In this case, in the very-close-distance region, the amount of increase of the weak voltage value (position increase amount) that increases monotonically in accordance with the increase of the moving amount increases, and when the position of the power transmission unit and the position of the power reception unit coincide with each other in the plan view, the maximum value and the position increase amount become zero. Therefore, for example, by obtaining a point of inflection (position where the differential value changes from the positive value to zero) from the position differential value of the weak voltage value, the positioning can be performed more accurately, and the charging can be performed at the maximum transmission efficiency position. Accordingly, the charging efficiency can be optimized.

When a direction where the power reception unit approaches the power transmission unit is referred to as an approaching direction and a direction where the power reception unit is separated from the power transmission unit is referred to as a separation direction, the control unit may be configured to determine whether a direction of the power reception unit is the approaching direction or the separation direction depending on a position differential value of the weak voltage value in a region where the weak voltage value is more than or equal to a predetermined voltage value, and determine whether the direction is the approaching direction or the separation direction depending on the weak voltage integrated value in a region where the weak voltage value is less than the predetermined voltage value.

Thus, whether the power reception unit moves to the approaching direction toward (direction to get close to) the power transmission unit or to the separation direction (direction to go away) can be determined certainly. Therefore, for example, it is possible to prevent the power transmission unit and the power reception unit from being displayed inversely in an in-vehicle display unit.

The control unit may further include a notification unit configured to set an optimum vehicle speed to position the power reception unit at the power transmission unit, and notify an occupant of the optimum vehicle speed or an order related to the vehicle speed.

In this manner, the occupant's operation of the accelerator pedal for positioning can be appropriately assisted.

In addition, the vehicle may further include a display unit as the notification unit, wherein the control unit may be configured to cause the display unit to display a target accelerator pedal opening to achieve the optimum vehicle speed and a current accelerator pedal opening, as the order related to the vehicle speed.

In this manner, by displaying the target accelerator pedal opening and the current accelerator pedal opening at the same time in the display unit, the occupant's operation of the accelerator pedal for positioning can be assisted more specifically so that the occupant can easily understand.

In addition, the control unit may include a steering angle detection sensor configured to detect a steering angle of the vehicle, wherein the control unit may be configured to cause the display unit to display a steering operating direction of the vehicle on a basis of the detected steering angle and a position of the power reception unit relative to the power transmission unit.

By displaying the steering operating direction of the vehicle in the display unit, the occupant's steering operation for positioning can be assisted more specifically so that the occupant can easily understand.

According to the present invention, the position (distance) of the power reception unit relative to the power transmission unit can be accurately detected.

Furthermore, according to the present invention, the charging efficiency for the energy storage device of the vehicle can be optimized.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 15 is a detailed flowchart for describing calculation of the vehicle moving amount as a parameter, a reset process/initialization process of the vehicle moving amount and the weak voltage integrated value, and the like;

DESCRIPTION OF THE PREFERRED EMBODIMENTS

[Structure]

Figure 1:
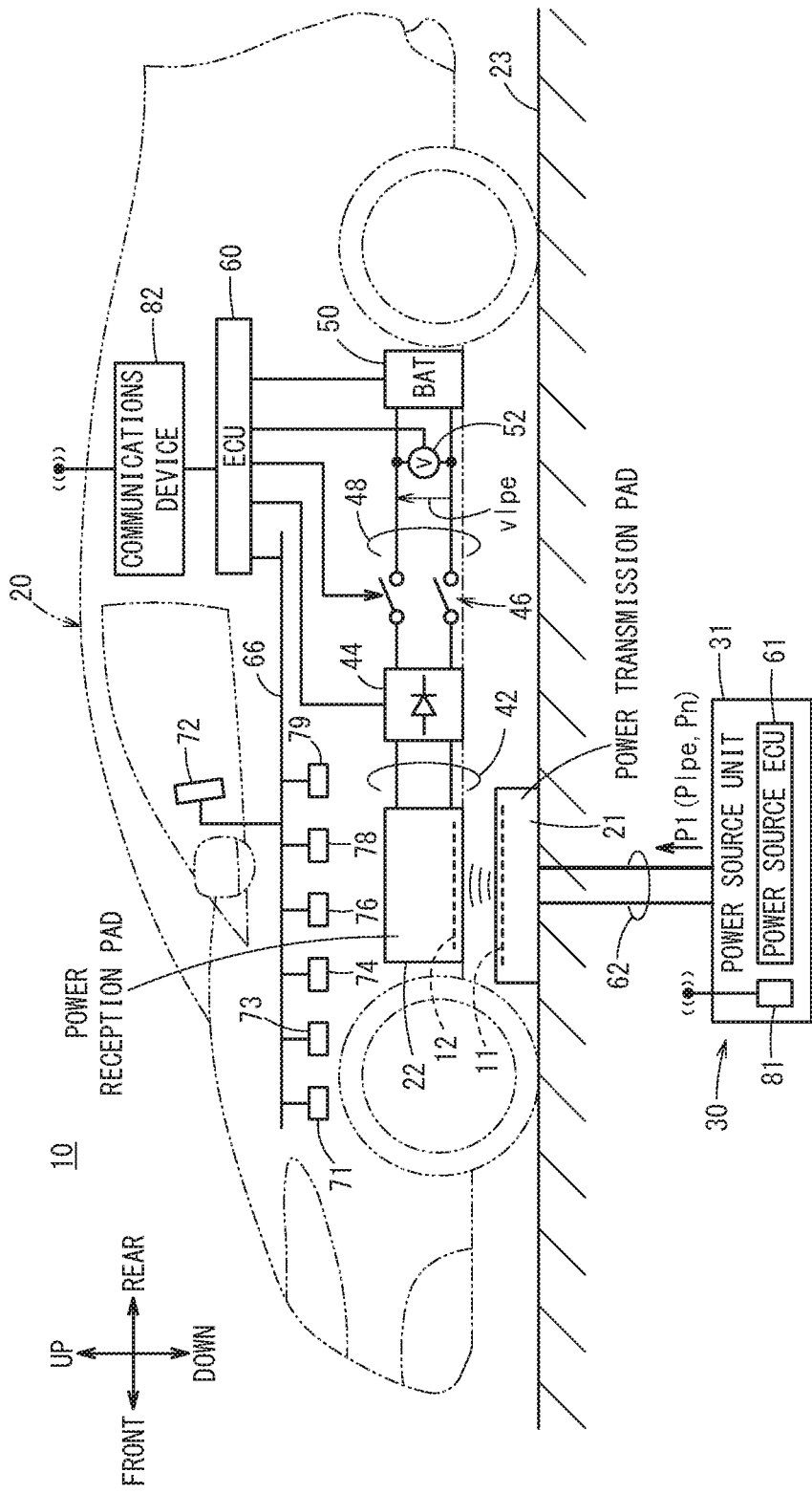
FIG. 1 is a schematic side view of a non-contact power transmission system according to an embodiment.
Figure 2:
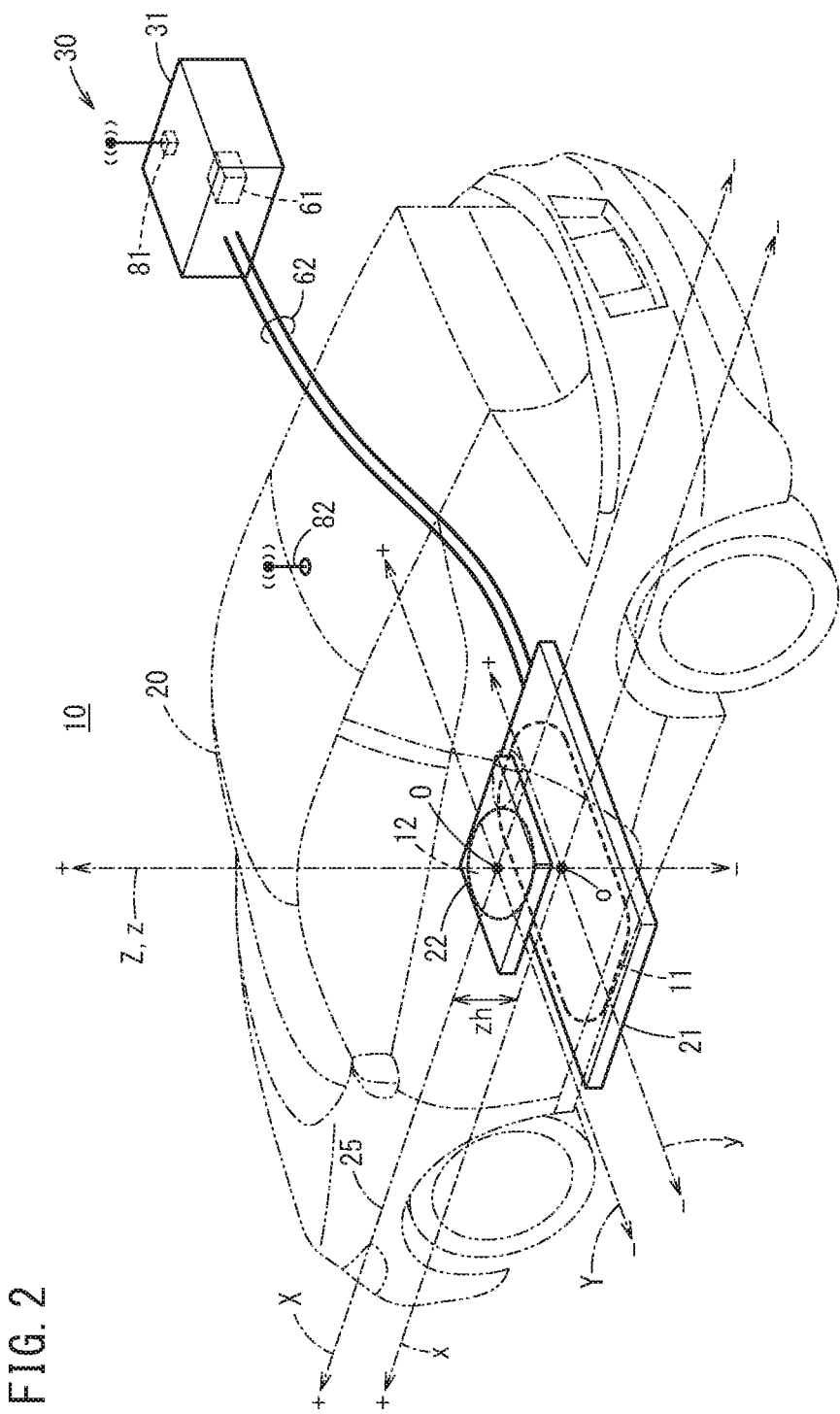
FIG. 2 is a schematic perspective view of the non-contact power transmission system illustrated in FIG. 1.

FIG. 1 is a schematic side view of a non-contact power transmission system 10 according to an embodiment. FIG. 2 is a schematic perspective view of the non-contact power transmission system 10 illustrated in FIG. 1.

As illustrated in FIG. 1 and FIG. 2, the non-contact power transmission system 10 basically includes a charging station 30 and a vehicle 20 including an energy storage device (BAT) 50 corresponding to a battery.

The energy storage device 50 of the vehicle 20 is charged without contact (wirelessly) by the charging station 30.

The charging station 30 includes a power transmission pad (primary pad) 21 as a power transmission unit that is provided on a road surface such as a ground 23, and a power source unit 31 that supplies to a power transmission coil 11 in the power transmission pad 21, an AC power with a reference frequency fr through a cable 62. The reference frequency fr is higher than low frequency, for example, commercial frequency from 50 Hz to 60 Hz, and lower than or equal to several hundreds of kilohertz [kHz].

In this embodiment, the power transmission pad 21 is provided on the ground 23 of a parking space or the like, as illustrated schematically in FIG. 1.

The vehicle 20 is an electric vehicle (EV), a plug-in hybrid vehicle (PHV), or a plug-in fuel cell vehicle (PFCV), and includes a power reception pad (secondary pad) 22 as a power reception unit that is provided on a bottom part of the vehicle 20. The power reception pad 22 includes a power reception coil 12 as a secondary coil.

Figure 3A:
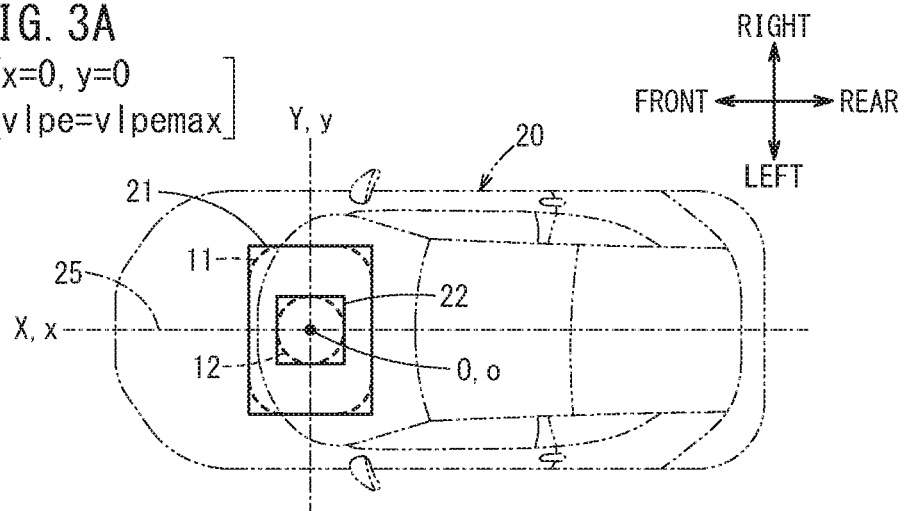
FIG. 3A is a schematic plan view illustrating a state that a power reception pad is positioned accurately at a power transmission pad.

FIG. 3A is a schematic plan view illustrating a state that the power reception pad 22 is positioned at the power transmission pad 21 of the charging station 30. The power reception pad 22 is disposed symmetrically with respect to a vehicle body center line 25 of the vehicle 20. In FIG. 3A, arrows indicate a front direction, a rear direction, a left direction, and a right direction of the vehicle 20.

FIG. 1 and FIG. 2 illustrate a state that the power reception pad 22 is positioned at the power transmission pad 21 in a manner similar to that of FIG. 3A. Note that, in FIG. 1, arrows indicate a front direction, a rear direction, a downward direction, and an upward direction of the vehicle 20.

In the positioned state, a main surface of the power transmission coil 11 (generally, an upper surface of power transmission pad 21) and a main surface of the power reception coil 12 (generally, a bottom surface of power reception pad 22) face each other in parallel.

In FIG. 2 and FIG. 3A, the power reception coil 12 on the vehicle 20 side has a circular shape as shown by a bold dashed line in the power reception pad 22 with a square shape. On the other hand, the power transmission coil 11 on the charging station 30 side has an approximately laterally long elliptic shape as shown by a bold dashed line in the power transmission pad 21 with a rectangular shape.

Note that, the power transmission coil 11 and the power reception coil 12 may have a quadrangular shape (square or rectangular shape), or a circular shape.

As illustrated in FIG. 1, the power source unit 31 of the charging station 30 includes a power source electronic control unit (ECU) 61 and a communications device 81 including a transmission/reception antenna. The power source unit 31 is connected to a commercial AC power source with a frequency from 50 Hz to 60 Hz that is not shown.

The power source unit 31 generates a transmission power P1 with a low frequency of several tens of kilohertz, for example, from the AC power source, and supplies the power to the power transmission coil 11 of the power transmission pad 21 through the cable 62. Note that, the transmission power P1 is switched by the power source ECU 61 between a weak power Plpe (lpe: low power excitation) for positioning and a main power Pn (Plpe<<Pn) by a normal current for main charging. From the power transmission pad 21, a weak power (this weak power is also referred to as Plpe) corresponding to the weak power Plpe or a main power (this main power is also referred to as Pn) corresponding to the main power Pn is transmitted.

In FIG. 2, a positioning process is performed by causing the vehicle 20 to travel so that xyz-axes drawn on the power transmission pad 21 (power transmission coil 11) coincide with XYZ-axes drawn on the power reception pad 22 (power reception coil 12) of the vehicle 20, respectively in the plan view. Note that an original position (coordinate origin) o of the xyz-axes (xyz coordinate) of the power transmission pad 21 (power transmission coil 11) is a center of the power transmission coil 11, and an original position (coordinate origin) O of the XYZ-axes (XYZ coordinate) of the power reception pad 22 (power reception coil 12) is a center of the power reception coil 12.

Therefore, the positioning process is a process to cause the center of the power reception coil 12 (coordinate origin O) of the power reception pad 22 of the vehicle 20 to coincide with the center of the power transmission coil 11 (coordinate origin o) of the power transmission pad 21 of the charging station 30 in the plan view.

In a case where both centers (coordinate origins O, o) coincide with each other (z-axis and Z-axis coincide with each other), even if the XY-axes of the power transmission pad 21 (power transmission coil 11) are rotated with respect to the xy-axes of the power reception pad 22 (power reception coil 12), a power transmission efficiency (power reception efficiency=Prn/Pn=reception power of power reception pad 22/transmission power of power transmission pad 21) does not change.

As illustrated in FIG. 1, the power reception pad 22 of the vehicle 20 is connected to the energy storage device 50 through a wire 42, a rectifier 44, a wire 48 including a contactor 46, and a voltage sensor 52.

The rectifier 44, the contactor 46, and the energy storage device 50 are controlled by an electronic control unit (ECU) 60.

The ECU 60 is connected to an in-vehicle communication line 66 to control the entire vehicle 20.

This in-vehicle communication line 66 is connected to a rear camera (imaging device) 71 and a display unit (display device) 72. The rear camera 71 is used for seeing a rear side of the vehicle 20 and the display unit 72 also serves as an input device (touch sensor) to be operated by an occupant such as a driver. The in-vehicle communication line 66 is also connected to a speaker/buzzer 73, a vehicle speed sensor 74, an accelerator pedal sensor 76, a steering angle sensor 78, a shift position sensor 79, and the like. The ECU 60 uses vehicle information detected by the sensors 74, 76, 78, and 79 {a vehicle speed Vv, an accelerator pedal opening (accelerator opening) θa, a steering angle (corresponding to direction angle of front wheels) θs, a gear shift position Sp (parking position P, reverse position R, neutral position N, drive position D)}.

As the display unit 72, a display unit of a navigation device disposed on a dashboard is used, for example. On the display unit 72, the ECU 60 displays, for example, positioning progress information as assistance information for a driver's positioning travel.

The ECU 60 of the vehicle 20 performs communication such as pairing with the power source ECU 61 through a communications device 82 that is connected to the ECU 60 and includes a transmission/reception antenna, and the communications device 81 of the power source unit 31 of the charging station 30.

In the positioning process in this embodiment, the power reception pad 22 is positioned at the power transmission pad 21 of the charging station 30 in a manner that the driver drives and steers the vehicle 20 while seeing the positioning assistance information (positioning progress status) on the display unit 72. However, the positioning process may be performed by what is called automated parking.

Figure 4:
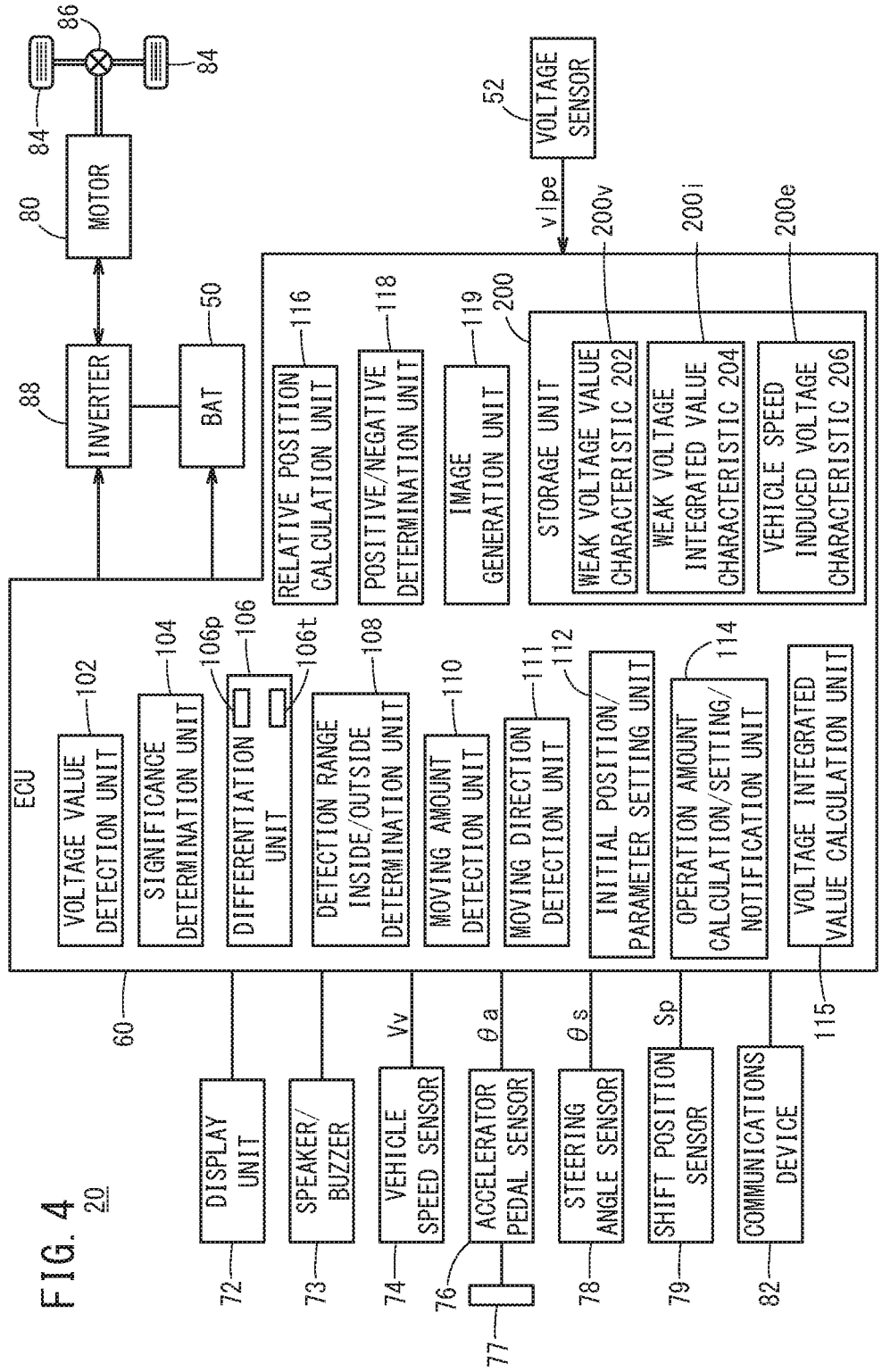
FIG. 4 is a function block diagram of the vehicle.

FIG. 4 is a function block diagram of the vehicle 20.

In the vehicle 20, driving wheels 84 are driven to rotate mechanically by a motor 80 through a transmission 86. The motor 80 is driven to rotate electrically through an inverter 88 corresponding to a driving device.

To a power source input terminal of the inverter 88, a DC power is supplied from the energy storage device 50. To a control input terminal of the inverter 88, an on/off control signal of a switching element is supplied from the ECU 60. The on/off control signal is used for converting the DC power from the energy storage device 50 into three-phase power (three-phase AC power) in accordance with the accelerator pedal opening θa or the like output from the accelerator pedal sensor 76.

The motor 80 for driving the vehicle 20 is power-driven by the three-phase AC power, a torque of the motor 80 is transmitted to the driving wheels 84 of the vehicle 20 through the transmission 86. The vehicle 20 includes, in addition to a driving mechanism including the motor 80, a steering mechanism including a steering wheel, an electric power steering device, or the like, and a braking mechanism including an electric brake, a disk brake, or the like that are not shown.

Each of the power source ECU 61 corresponding to a control unit of the charging station 30 and the ECU 60 corresponding to a control unit of the vehicle 20 is a computer including a microcomputer, and includes a central processing unit (CPU), a ROM (including EEPROM) corresponding to a memory, a random access memory (RAM), an input/output device such as an A/D converter and a D/A converter, a timer corresponding to a clocking unit, and the like. When the CPU reads out and executes programs recorded in the ROM, the power source ECU 61 and the ECU 60 function as a various function achievement unit (function achievement means) such as a control unit, a calculation unit, and a processing unit. These functions may be achieved by hardware. The ECU 60 is not limited to one ECU, and may be divided into a plurality of ECUs such as a vehicle ECU, a charging ECU, and an energy storage device ECU.

In this embodiment, the ECU 60 includes a voltage value detection unit 102 that acquires a weak voltage value (received voltage) vlpe detected by the voltage sensor 52, a significance determination unit 104 for the weak voltage vlpe, a differentiation unit 106 including a position differentiation unit 106p and a time differentiation unit 106t, a detection range inside/outside determination unit 108 for the weak power, a moving amount detection unit (moving displacement amount detection unit) 110, a moving direction detection unit 111, an initial position/parameter setting unit 112, an operation amount calculation/setting/notification unit 114, a weak voltage integrated value calculation unit 115, a relative position calculation unit (position detection unit) 116 that calculates (detects) a position (relative position) of the power reception coil 12 relative to the power transmission coil 11, a positive/negative determination unit 118 that determines whether the power reception coil 12 exists on a positive side (see FIG. 2) or a negative side (see FIG. 2) on an x-axis of the power transmission coil 11, and an image generation unit 119 that generates an assistance image for positioning, and the like.

Furthermore, in a storage unit 200 of the ECU 60, the ECU 60 stores a voltage value characteristic (also referred to as weak voltage value characteristic) 202 of the weak voltage value vlpe in a weak voltage value characteristic storage unit (voltage value characteristic storage unit) 200v, and stores a characteristic (referred to as weak voltage integrated value characteristic) 204 of a weak voltage integrated value vilpe corresponding to a position integration value of the weak voltage value characteristic 202 in a weak voltage integrated value characteristic storage unit (voltage integrated value characteristic storage unit) 200i.

Note that, instead of storing the weak voltage integrated value vilpe obtained from the weak voltage integrated value characteristic 204 in advance, the weak voltage integrated value vilpe may be generated from the weak voltage value characteristic 202 for a z-axis height zh every time parking for positioning is performed.

Here, the weak voltage value characteristic 202 and the weak voltage integrated value characteristic 204 are three-dimensional maps of the weak voltage value vlpe and the weak voltage integrated value vilpe. In these maps, a position xy and the z-axis height zh are parameters.

An induced voltage characteristic storage unit 200e of the storage unit 200 stores a vehicle speed induced voltage characteristic 206 corresponding to a map expressing a correspondence relation among a distance from the power transmission coil 11 (radial distance), the vehicle speed Vv, and induced voltage of the power reception coil 12.

[Operation]

Next, [entire operation] of the above embodiment and each operation of [first to sixth examples] are described below.

[Entire Operation]

In positioning, the driver of the vehicle 20 who wants to charge the energy storage device 50 at the charging station 30 of the parking space first drives the vehicle 20 backward (backward traveling) before the pairing. In the backward traveling, the driver drives the vehicle 20, for example, along a side wall of the parking space or along a side line of a parking frame and/or while seeing a video image of the rear camera 71 on the display unit 72 so that the vehicle body center line 25 of the own vehicle 20 coincides with an x-axis of the power transmission pad 21 of the charging station 30.

Note that, on the x-axis and a y-axis of the power transmission pad 21, white lines that can be seen by the driver, the rear camera 71, or the like may be drawn.

When the driver drives the vehicle 20 to come close to the power transmission pad 21, the vehicle 20 is stopped once. For example, when the vehicle 20 has come to a position where the power transmission pad 21 overlaps with a bottom surface of a rear part side of the vehicle 20 and the power transmission pad 21 is not seen in the video image of the rear camera 71, the vehicle 20 is stopped once.

In this stop position, the driver presses a start button of "positioning process" for non-contact charging on the display unit 72 of a touch panel type.

The ECU 60 having detected the pressing of the start button of "positioning process" performs pairing for requesting the power source ECU 61 to transmit a weak power through a wireless LAN such as WiFi through the communications device 82 and the communications device 81 of the power source ECU 61.

If a mutual authentication is established by the pairing, the power source ECU 61 of the charging station 30 supplies a constant weak AC current to the power transmission coil 11 of the power transmission pad 21. By this weak current, the constant weak power Plpe is transmitted wirelessly from the power transmission pad 21 (power transmission coil 11).

On the other hand, if the authentication is established, the contactor 46 is changed to a closed state by the ECU 60 of the vehicle 20 and the voltage value detection unit 102 starts to acquire and detect the weak voltage value vlpe through the voltage sensor 52. However, at the time when the authentication is established, the weak voltage value vlpe is out of a detection range of the weak voltage value vlpe; thus, the weak voltage value vlpe is zero and is not detected. Note that the voltage sensor 52 may be provided with a noise removal filter.

When an accelerator pedal 77 is stepped on lightly to rotate the motor 80 and the vehicle 20 starts to travel slowly, power reception of the weak power Plpe is started and the voltage value detection unit 102 starts a detection (acquisition) of the weak voltage value vlpe that is not zero at the initial position (known position as will be described below).

Next, the ECU 60 analyzes the weak voltage value vlpe corresponding to a power reception voltage using the weak voltage value characteristic 202 and the like. From the analysis result, the ECU 60 displays a position of the power transmission coil 11 on the charging station 30 side, a position of the power reception coil 12 (relative position) on the vehicle 20 side relative to the position of the power transmission coil 11, and the like on the display unit 72. The driver is notified of such information, which is helpful for the driver to perform positioning travelling.

Then, the positioning traveling is continued and, when it is detected that the weak voltage value vlpe has become the known maximum peak value vlpemax, the positioning process is terminated and the driving of the motor 80 of the vehicle 20 is stopped.

At the position where the positioning process is terminated, the ECU 60 of the vehicle 20 notifies the power source ECU 61 of the charging station 30 that positioning is completed.

After that, the power source ECU 61 changes the transmission power P1 of the power source unit 31 from the weak power Plpe to the main power Pn corresponding to a large normal power, and supplies the power to the power transmission coil 11 of the power transmission pad 21. Therefore, the non-contact charging of the energy storage device 50 by the main power Pn is performed through the power reception coil 12 on the power reception pad 22.

First Example

<Procedure of Detecting Relative Position of Power Reception Coil 12 to Power Transmission Coil 11>

Figure 5:
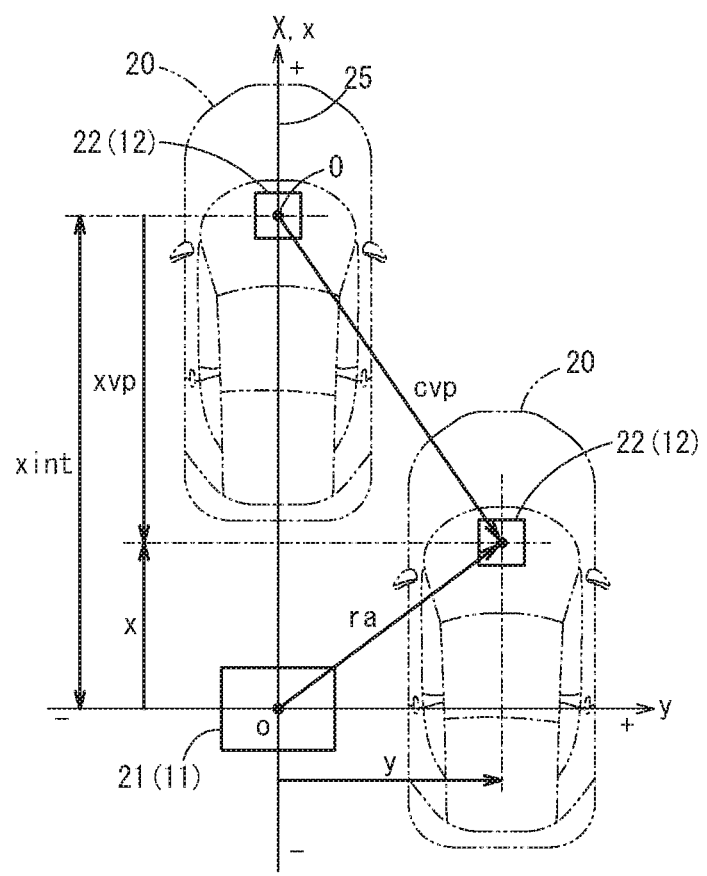
FIG. 5 is a schematic plan view for describing positioning.

FIG. 5 is a schematic plan view in which the vehicle 20 on an upper side is currently traveling backward from above (positive side) of the x-axis in the drawing to the center o of the power transmission pad 21 (power transmission coil 11) while the weak power Plpe is transmitted from the power transmission coil 11 after the pairing. In FIG. 5, the position of the vehicle 20 on the upper side corresponds to the position where the voltage value detection unit 102 of the vehicle 20 detects the weak power through the voltage sensor 52 for the first time and the weak voltage value vlpe (vlpe=0+) is detected.

When the weak voltage value vlpe is detected for the first time, the ECU 60 sets the position to an initial position xint {xint=(x, y)=(xint, 0)} with a known distance with reference to the weak voltage value characteristic 202, and after that, starts the positioning process with reference to the weak voltage value characteristic 202. At the same time, the weak voltage integrated value calculation unit 115 starts to calculate the weak voltage integrated value vilpe obtained by position integration of the detected weak voltage value vlpe.

Here, at the initial position xint, the vehicle body center line 25 of the vehicle 20 coincides with the x-axis of the power transmission coil 11.

In the practical application, a distance x between the origin o of the power transmission coil 11 and the initial position xint is less than or equal to a vehicle width of the vehicle 20, and the driver cannot see the power transmission coil 11 through the rear camera 71 of the vehicle 20 directly.

In FIG. 5, the distance of the x-axis in quadrants (positions) above the y-axis is a positive value, and the distance x of the x-axis in quadrants (position) below the y-axis is a negative value. In addition, the distance y of the y-axis in quadrants (position) on the right side of the x-axis is a positive value, and the distance y of the y-axis in quadrants (position) on the left side of the x-axis is a negative value.

After the pairing, from just before the initial position xint, the vehicle 20 is traveling backward for positioning for parking at a slow constant target vehicle speed Vvtar, which is slower than a speed slow enough for the vehicle 20 to stop immediately and which is determined by the ECU 60 or the like, for example.

In FIG. 5, the vehicle 20 on the right side is at the current position (current coordinate position, relative radius) ra {ra=(x, y)}. Here, in FIG. 5, the deviation amount of the vehicle 20 that is currently traveling backward for positioning is exaggerated. Note that the current position ra(x, y) of the vehicle 20 is at a central position (origin O) of the power reception pad 22 (power reception coil 12).

In FIG. 5, a displacement of the vehicle from the initial position xint to the current position ra is referred to as a vehicle moving amount (also referred to as moving amount or moving displacement amount) cvp. Note that the vehicle moving amount cvp can be obtained by the moving amount detection unit (also referred to as moving displacement amount detection unit) 110 from an integrated value $\int Vv \cdot dt = cvp$ on the basis of the vehicle speed Vv and a minute time dt, or can be obtained by vehicle speed Vv×required time if the vehicle speed Vv is constant.

Here, the relative moving amount (moving amount, vehicle moving amount, x-axis moving amount) xvp of the power reception coil 12 on the x-axis from the initial position xint to the current position ra(x, y) in a case where the vehicle 20 travels straight backward along the x-axis can be obtained by the following expression (1):

$$xvp = xint - x \quad (1)$$

The x-axis position is calculated by the following expression (2) in which the expression (1) is varied:

$$x = xint - xvp \quad (2)$$

For example, positioning is completed when the vehicle 20 travels straight backward along the x-axis and the distance x becomes x=0.

In the first example, the relative moving amount xvp of the x-axis and the x-axis position (distance x) are obtained from the voltage characteristic (weak voltage value characteristic 202) by the electromagnetic induction of the power reception coil 12 and the power transmission coil 11, and the voltage characteristic (weak voltage integrated value characteristic 204) obtained by position integration of the weak voltage value characteristic 202 from the initial position xint to the center of the power transmission coil 11 (coordinate origin o).

Figure 6:
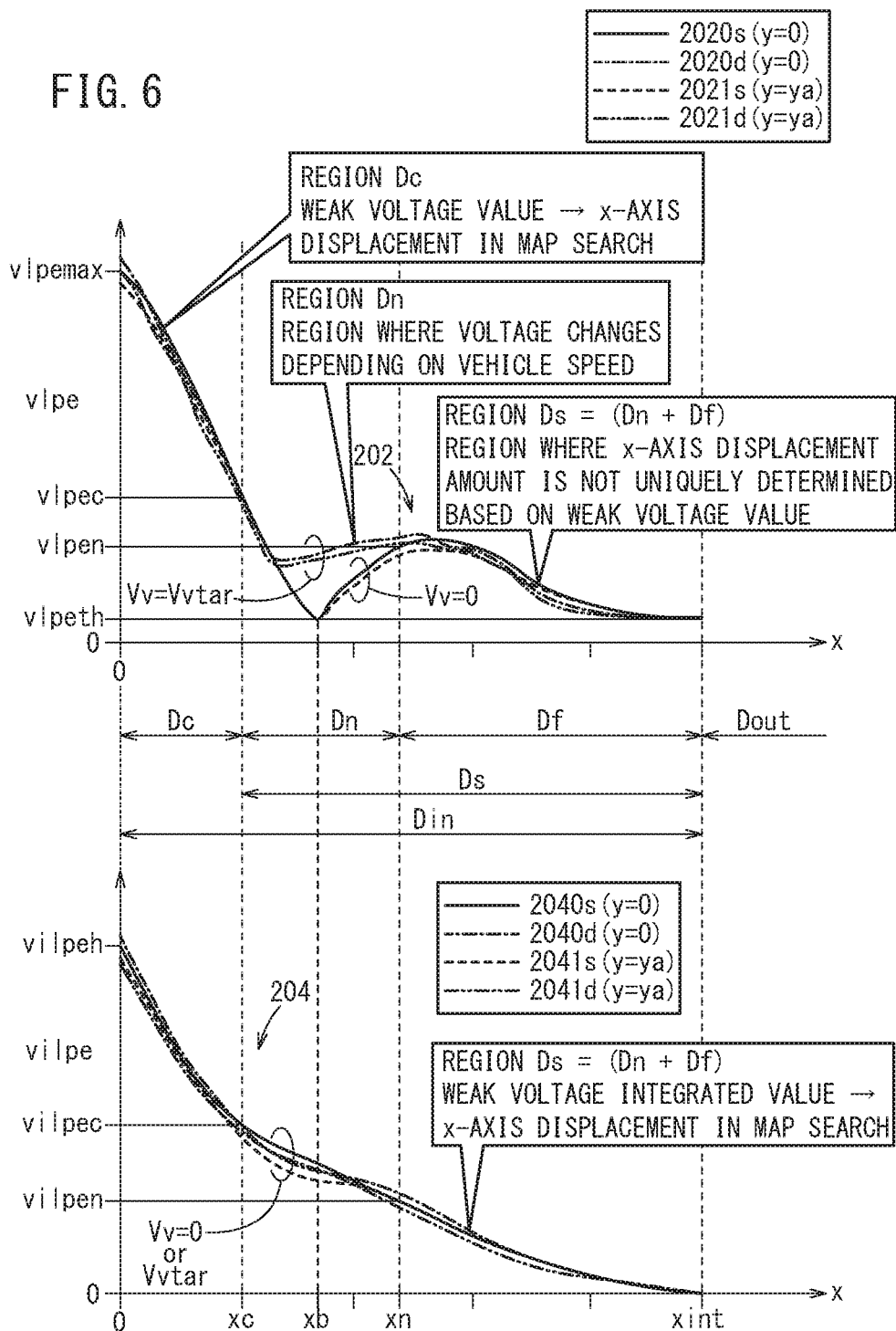
FIG. 6 is a characteristic explanatory diagram of a weak voltage value characteristic and a weak voltage integrated value characteristic.

The upper graph in FIG. 6 shows the weak voltage value characteristic 202 stored in advance as a map in the weak voltage value characteristic storage unit 200v. The lower graph in FIG. 6 shows the weak voltage integrated value characteristic 204 stored in advance as a map in the weak voltage integrated value characteristic storage unit 200i.

The weak voltage value characteristic 202 and the weak voltage integrated value characteristic 204 are the characteristics in a case where the difference zh (see FIG. 2) between the height of the power transmission coil 11 from the ground 23 (horizontal plane) on the z-axis and the height of the power reception coil 12 from the ground 23 (height from the ground 23 is also referred to as z-axis height) is the known height (distance).

In a case where the z-axis height zh is different from the known height, the weak voltage value characteristic 202 and the weak voltage integrated value characteristic 204 with height correction can be used.

In regard to the weak voltage value characteristic 202, the vertical axis expresses the weak voltage value vlpe and the horizontal axis expresses the distance x from the origin o on the x-axis (center of power transmission coil 11).

In the weak voltage value characteristics 202, a weak voltage value characteristic 2020s shown by a solid line is the characteristic on the x-axis when the value of the y-axis is y=0 [mm] and the vehicle speed Vv is Vv=0 [mm/s].

A weak voltage value characteristic 2021s shown by a dashed line is the characteristic on the x-axis when the value of the y-axis is y=ya [mm] (in this embodiment ya is a value of approximately less than xint/2) and the vehicle speed Vv is Vv=0 [mm/s].

The weak voltage value vlpe when the vehicle speed Vv=0 is a static electromotive voltage corresponding to the voltage generated by the magnetic field vibrating at the reference frequency fr, and the value depends on the shape of both coils (power transmission coil 11 and power reception coil 12). In this embodiment, as is understood from the weak voltage value characteristic 2020s at y=0 and the weak voltage value characteristic 2021s at y=ya, the voltage values are substantially the same in the range of the distance x=0 to xint although the value of the y-axis is different (in the range of y=0 to ya).

Figure 3B:
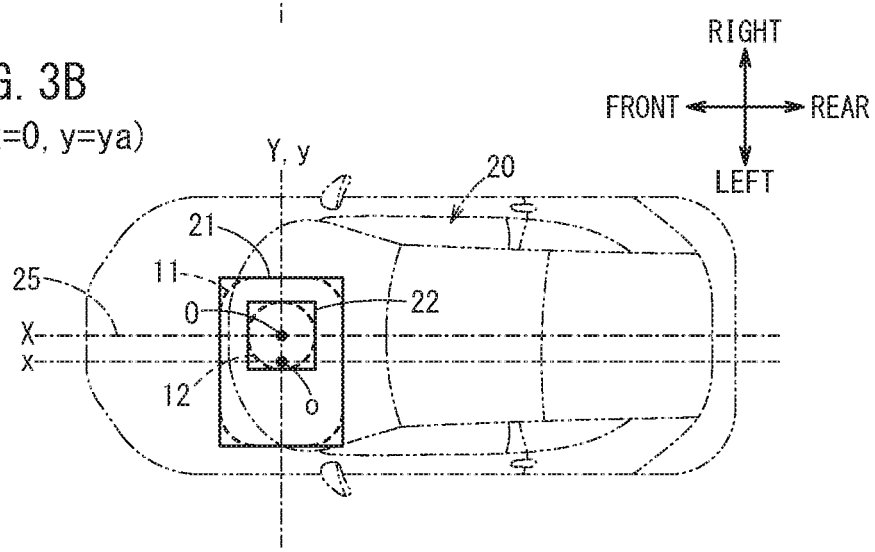
FIG. 3B is a schematic plan view illustrating a state that the power reception pad is deviated in a y-axis direction.

This is because, as illustrated in FIG. 3B, the power transmission coil 11 has a shape close to a laterally long elliptic shape and in this case, in regard to the deviation in the y-axis direction of the power reception coil 12 with a circular shape and a smaller area, the decrease in the number of interlinkage fluxes of the power transmission coil 11 has very little influence on the weak voltage value vlpe and if the deviation in the y-axis direction is less than or equal to a certain distance ya (y≤ya), there is almost no difference in weak voltage value vlpe on the y-axis at x=0.

Figure 3C:
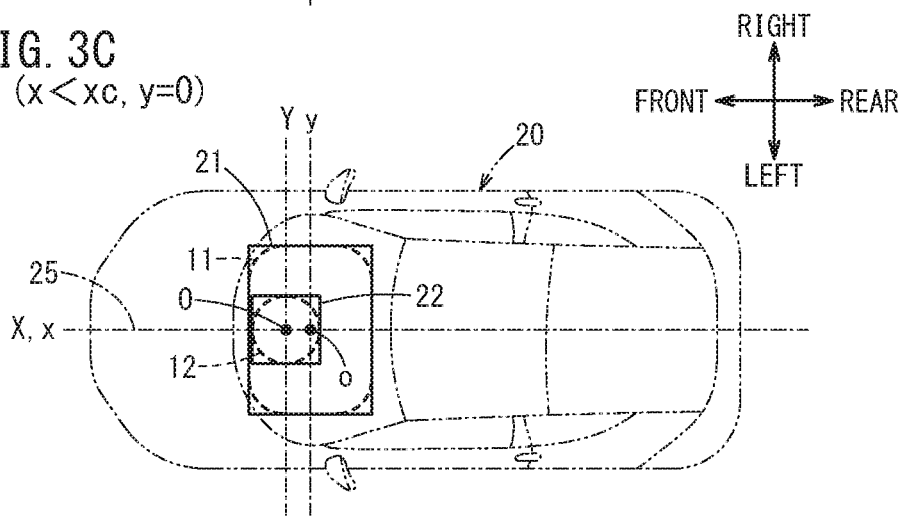
FIG. 3C is a schematic plan view illustrating a state that the power reception pad is within a very-close-distance region.

On the other hand, as illustrated in FIG. 3C, since the power transmission coil 11 has a shape close to a laterally long elliptic shape, the decrease in the number of interlinkage fluxes of the power transmission coil 11 has a large influence on the weak voltage value vlpe if the power transmission coil 11 is far from the power reception coil 12 in the x-direction by more than or equal to x that satisfies x>ya.

Therefore, in a very-close-distance region Dc close to the coordinate origin o where the distance x is about a distance to a very-close-distance threshold position xc, the weak voltage value vlpe more than or equal to the weak voltage value (threshold) vlpec can be detected. Thus, in this case, the relative moving amount xvp on the x-axis (see FIG. 5) can be obtained accurately with high sensitivity with reference to the weak voltage value characteristic 202 by using the detected weak voltage value vlpe as an argument.

As described above, in the weak voltage value characteristics 202, the weak voltage value characteristic 2020s shown by the solid line is the characteristic when the value of the y-axis is y=0 [mm] and the vehicle speed Vv is Vv=0 [mm/s].

In contrast, a weak voltage value characteristic 2020d shown by a one-dot chain line is the characteristic when the value of the y-axis is y=0 [mm] and the vehicle speed Vv is a target vehicle speed Vvtar that is constant and slow speed (Vv=Vvtar [mm/s]).

The weak voltage value characteristic 2020s when the vehicle speed Vv is Vv=0 (in a stop state) and the weak voltage value characteristic 2020d when the vehicle speed Vv is the target vehicle speed Vvtar are compared. This comparison indicates that the very-close-distance region Dc to the very-close-distance threshold position xc where the distance x from the origin o is short and a far-distance region Df from a close-distance threshold position xn to the initial position xint where the distance x from the origin o is long both have an approximately monotonically decreasing characteristic. A close-distance region Dn from the very-close-distance threshold position xc to the close-distance threshold position xn where the distance x from the origin o is medium includes a portion where voltage changes depending on the vehicle speed Vv (Vv=0, Vv=Vvtar) (portion where both characteristics 2020s and 2020d are separated from each other).

This is because a dynamic electromotive voltage (induced voltage) corresponding to the voltage generated in accordance with the electromagnetic induction rule when the power reception coil 12 itself moves at a vehicle speed Vv=Vvtar is added to the static electromotive voltage (vehicle speed Vv=0) corresponding to the voltage generated by the magnetic field that vibrates at the reference frequency fr.

It has been known that the portion (distance) where the voltage changes depends on, for example, the coil shape of the power reception coil 12 and the power transmission coil 11.

Therefore, in this embodiment, the correspondence relation between the vehicle speed Vv and the dynamic electromotive voltage (induced voltage) is stored in advance in the induced voltage characteristic storage unit 200e.

As shown on the upper graph in FIG. 6, there is a position (point) where the weak voltage value vlpe becomes vlpe=0 (in FIG. 6, a bottom peak value vlpeth including the offset) between the very-close-distance threshold position xc and the close-distance threshold position xn in the weak voltage value characteristic 2020s and the like, and this position is referred to as a bottom position (bottom distance) xb.

In this manner, the weak voltage value characteristic 202 (particularly, static weak voltage value characteristic 2020s, for example) is the characteristic as follows: since the distribution of the magnetic field varies depending on the coil shape or the like, the value of the weak voltage value vlpe corresponding to the amount of weak power transmitted from the center of the power transmission coil 11 to the entire periphery in a radial direction, which is taken along a cross section in a vertical direction, decreases from the maximum peak value (local maximum value) vlpemax of the power transmission coil 11 (center of power transmission unit) toward the outside in the radial direction and becomes a bottom peak value (local minimum value) vlpeth (vlpeth=0); the value increases from the bottom peak value vlpeth further toward the outside in the radial direction and becomes a side peak value (local maximum value) vlpen; and the value decreases from the side peak value vlpen further toward the outside in the radial direction and becomes zero at which the weak value Plpe cannot be detected.

In this manner, in a separation distance region Ds including both the close-distance region Dn and the far-distance region Df, the distance x exists at three locations (three positions) because of the characteristic in which the weak voltage value vlpe has unevenness toward the outside in the radial direction although the weak voltage value vlpe is the same. As a result, the distance x and the relative moving amount xvp are not uniquely determined based on the weak voltage value vlpe.

On the other hand, as is understood from the weak voltage value characteristic 202, in the very-close-distance region Dc that is set so that the weak voltage value vlpe becomes more than or equal to the weak voltage value (threshold) vlpec, which is much higher than the side peak value (local maximum value) Vlpen in the separation distance region Ds, the gradient of the weak voltage value characteristic 202 is steep and the distance x is determined uniquely relative to the weak voltage value vlpe; thus, the distance x (relative moving amount xvp) can be measured with high sensitivity (accuracy) by using the weak voltage value characteristic 202 with the steep gradient.

Note that the weak voltage value vlpe is the maximum peak value (local maximum value) vlpemax at the origin o where the distance x=0, and after the vehicle 20 passes the origin o, the value of the distance x becomes negative and the weak voltage value characteristic 202 becomes line-symmetrical with respect to the y-axis.

The weak voltage value (side peak value) vlpen corresponding to the local maximum value at x>0 in the middle of positioning and the weak voltage value (maximum peak value) vlpemax at x=0 are so-called points of inflection. Therefore, the position differential value vdplpe of the weak voltage value vlpe (weak voltage position differential value) expressed by the following expression (3) calculated by the position differentiation unit 106*p* is zero (vdplpe=0).

$$vdplpe=d(vlpe)/(dx) \quad (3)$$

Note that attention should be paid to the fact that the position differential value vdplpe of the weak voltage value vlpe is zero even at the bottom position xb because of the weak voltage value characteristic 2020*s*, for example.

In order to uniquely determine the distance x and the relative moving amount xvp in the separation distance region Ds, the weak voltage integrated value characteristic 204 shown in the lower graph in FIG. 6 is used.

The vertical axis of the weak voltage integrated value characteristic 204 is the integrated value (hereinafter referred to as weak voltage integrated value vilpe) of the weak voltage value vlpe calculated in advance from the following expression (4) on the basis of the weak voltage value characteristic 202, and the horizontal axis is the distance x from the origin o on the x-axis.

$$vilpe=\int vlpe \cdot dx \quad (4)$$

In the weak voltage integrated value characteristics 204, a weak voltage integrated value characteristic 2040*s* shown by a solid line is the characteristic when the value of the y-axis is y=0 [mm] and the vehicle speed Vv is Vv=0 [mm/s].

A weak voltage integrated value characteristic 2041*s* shown by a dashed line is the characteristic when the value of the y-axis is y=ya [mm] and the vehicle speed Vv is Vv=0 [mm/s].

A weak voltage integrated value characteristic 2040*d* shown by a one-dot chain line is the characteristic when the value of the y-axis is y=0 [mm] and the vehicle speed Vv is Vv=Vvtar [mm/s].

A weak voltage integrated value characteristic 2041*d* shown by a two-dot chain line is the characteristic when the value of the y-axis is y=ya [mm] and the vehicle speed Vv is Vv=Vvr [mm/s] (referred to as reference vehicle speed).

In the weak voltage integrated value characteristic 204, it is understood that in the separation distance region Ds including both the close-distance region Dn and the far-distance region Df, the weak voltage integrated value vilpe monotonically increases as the relative moving amount xvp increases and the distance x is uniquely determined based on the weak voltage integrated value vilpe.

At a position on the x-axis of the weak voltage integrated value characteristic 204, the weak voltage integrated value vilpe has a value as follows: the weak voltage integrated value vilpe is zero at the initial position xint; at the close-distance threshold position xn, the weak voltage integrated value vilpe is a weak voltage integrated value vilpen (vilpen=∫vlpe·dx: integration section is from 0 at xint to xint−xn) corresponding to the position integration value from the initial position xint to the close-distance threshold position xn (side peak value vlpen) in the weak voltage value characteristic 202; at the very-close-distance threshold position xc, the weak voltage integrated value vilpe is a weak voltage integrated value vilpec (vilpec=∫vlpe·dx: integration section is from 0 at xint to xint−xc) corresponding to the position integration value from the initial position xint to the very-close-distance threshold position xc (weak voltage value vlpec); and at the origin o (where the distance x is zero), the weak voltage integrated value vilpe is a weak voltage integrated value vilpeh (vilpeh=∫vlpe·dx: integration section is from 0 at xint to the xint value).

After the vehicle 20 passes the origin o, the weak voltage integrated value characteristic 204 is the increasing characteristic that is point-symmetrical with the weak voltage integrated value vilpeh as a center. Therefore, in the separation distance region Ds, if the weak voltage integrated value vilpe is less than the weak voltage integrated value vilpec, the distance x is determined to be "positive" and if the weak voltage integrated value vilpe is more than or equal to the weak voltage integrated value vilpec, the distance x is determined to be "negative".

That is to say, depending on whether the weak voltage integrated value vilpe is less than the weak voltage integrated value (weak voltage threshold integrated value) vilpec, whether the position from the near side to the far side over the origin o is positive (vilpe<vilpec) or negative (vilpe>vilpec) can be determined.

As described in the balloons in FIG. 6, in the first example, with reference to the weak voltage integrated value characteristic 204 and the weak voltage value characteristic 202, in a case of obtaining the distance x on the x-axis from the origin o, that is, the position of the power reception coil 12, in other words, the relative moving amount xvp on the x-axis from the initial position xint, the detected weak voltage value vlpe and the weak voltage integrated value vilpe corresponding to the position integration value thereof are obtained for each minute moving amount dx.

Then, in regions (in the close-distance region Dn and the far-distance region Df) from the initial position xint to the very-close-distance threshold position xc where the relative moving amount xvp on the x-axis is not uniquely determined based on the obtained weak voltage value vlpe, the distance x from the origin o, that is, the relative moving amount xvp on the x-axis from the initial position xint is obtained using the obtained weak voltage integrated value vilpe as an argument with reference to the weak voltage integrated value characteristic 204 in which the relative moving amount xvp is uniquely determined.

On the other hand, in a region (very-close-distance region Dc) from the very-close-distance threshold position xc to the origin o (distance x=0) where the relative moving amount xvp on the x-axis from the weak voltage value vlpe is uniquely determined, the distance x from the origin o, that is, the relative moving amount xvp on the x-axis from the initial position xint is obtained using the weak voltage value vlpe as an argument with reference to the weak voltage value characteristic 202.

[Display of Parking Assistance]

Here, description is made of an image display in the display unit 72 for parking assistance in positioning, for the driver of the vehicle 20.

In order to position the power reception coil 12 of the vehicle 20 at the power transmission coil 11 of the charging station 30, it is preferable to notify the driver of a target accelerator pedal opening (target accelerator opening) θatar corresponding to how deeply the driver needs to step on the accelerator pedal 77 in order to achieve the target vehicle speed Vvtar, and a time Tp required for positioning corresponding to the time for which the driver steps on the accelerator pedal 77.

Figure 7:
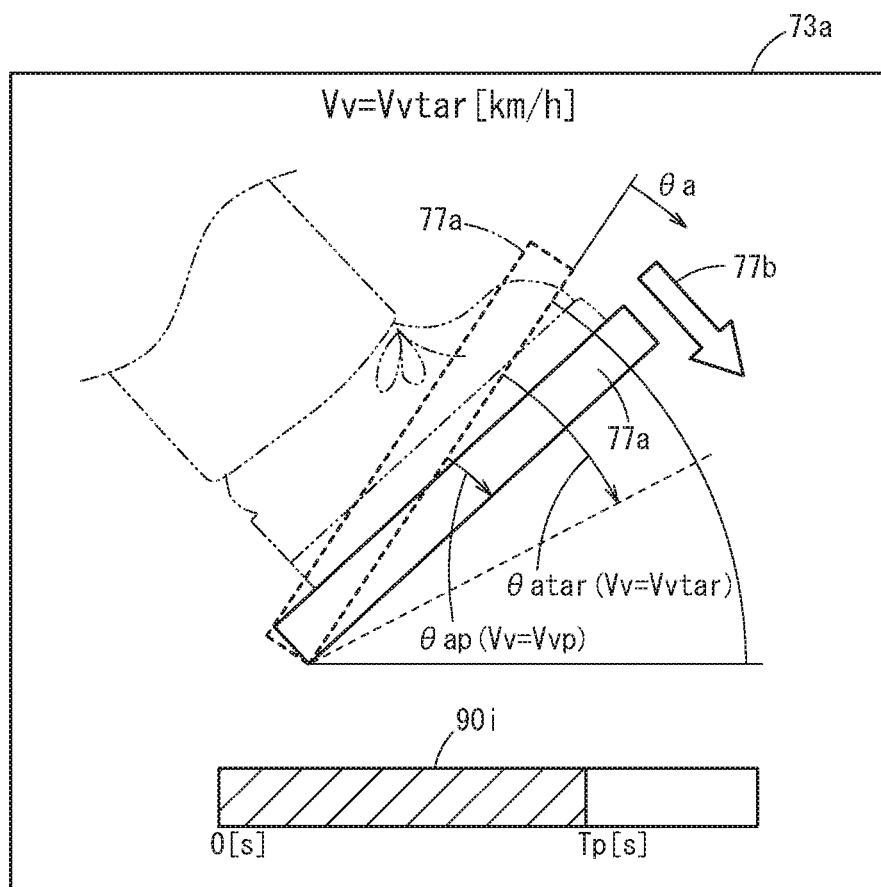
FIG. 7 is an explanatory diagram illustrating an example of an image for parking assistance.

As illustrated in FIG. 7, the display unit 72 schematically displays an assistance image 73a for positioning that is generated by the image generation unit 119.

The assistance image 73a includes an accelerator pedal image 77a, the accelerator opening (accelerator pedal opening) θap at a current vehicle speed Vvp, an accelerator pedal opening θatar necessary to achieve the target vehicle speed Vvtar (target accelerator opening), and an operation direction 77b of the accelerator pedal 77. By the display of these images, the driver can perform a smooth positioning operation with the accelerator pedal 77.

Note that the accelerator pedal image 77a that is drawn with a dashed line is the accelerator pedal 77 at an original position, and the accelerator pedal image 77a that is drawn with a solid line is the accelerator pedal 77 at a current position.

In addition, the assistance image 73a includes a gauge image 90i for indicating the time Tp required for positioning in order to notify how many seconds it takes to reach the origin o corresponding to the target position if the driver keeps stepping on the accelerator pedal 77 with the current accelerator opening θap.

In this manner, the target vehicle speed Vvtar [km/m] that is optimal for the smooth parking is defined as the target accelerator opening θatar. The driver can be notified so that the driver can visually and easily recognize the current accelerator opening θap and the target accelerator opening θatar.

Figure 8:
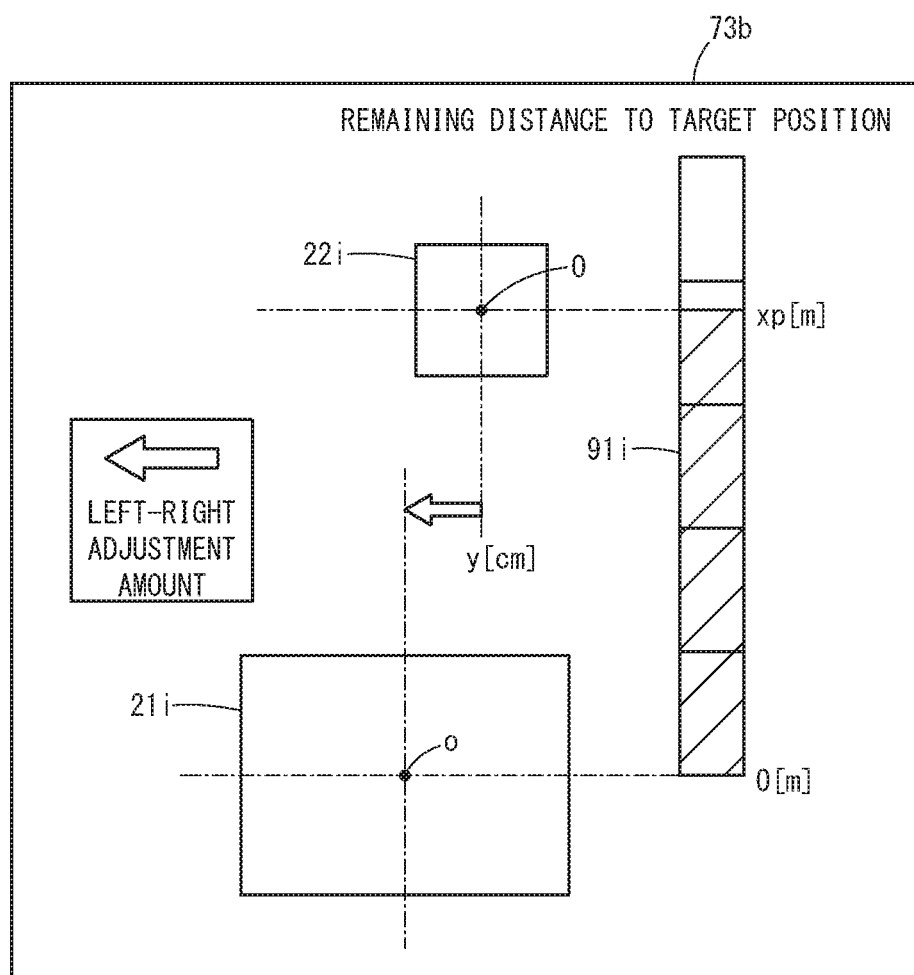
FIG. 8 is an explanatory diagram illustrating another example of the image for parking assistance.

FIG. 8 illustrates a schematic image display of another assistance image 73b for positioning that is generated by the image generation unit 119.

The assistance image 73b includes a current position of a power reception pad image 22i based on a position of a power transmission pad image 21i, a left-right adjustment amount of steering wheel, and a gauge image 91i that notifies a remaining distance xp from the current position to the origin o as the target position.

By displaying these assistance images 73a, 73b for positioning in this manner, the driver can park the vehicle 20 at the appropriately (accurately) aligned position (position where the origin o and the origin O coincide with each other in the plan view) without a skill.

Thus, in the first example, the distance x corresponding to the relative position of the power reception coil 12 from the coordinate origin o of the x-axis of the power transmission coil 11 can be estimated (obtained) on the basis of the weak voltage value vlpe by the electromagnetic induction of the power reception coil 12 and the power transmission coil 11, and the weak voltage integrated value vilpe corresponding to the moving displacement of the power reception coil 12.

In this case, in the very-close-distance region Dc where the distance x is uniquely determined, the distance x is calculated based on the weak voltage value vlpe with reference to the weak voltage value characteristic 202 set in accordance with the known z-axis height zh.

In this case, positive/negative of the x-axis in the very-close-distance region Dc is determined based on a gradient of a weak voltage position differential value vdlpe expressed in the expression (3) and the shift position Sp.

Whether the vehicle 20 enters the very-close-distance region Dc from the close-distance region Dn is determined based on whether the weak voltage value vlpe exceeds the weak voltage value vlpec or whether the weak voltage integrate value vilpe exceeds the weak voltage integrated value vilpc at the same position as the weak voltage value vlpec.

Positive/negative of the x-axis in the separation distance region Ds is determined based on a gradient of a position differential value (position differential value of weak voltage integrated value) vdpilpe of the weak voltage integrated value vilpe calculated by the following expression (5), and the shift position Sp.

$$vdpilpe = d(vilpe)/dx \qquad (5)$$

In the separation distance region Ds where the distance x is not uniquely determined based on the weak voltage value characteristic 202, the distance x is calculated based on the weak voltage integrated value characteristic 204 by which the distance x is uniquely determined.

Note that the current position (radial distance) ra(x, y) of the vehicle 20 may be obtained without using the weak voltage integrated value characteristic 204 but by simply using the initial position xint when the vehicle 20 enters the inside of the far-distance region Df of the weak voltage detection range (referred to as weak voltage detection range inside region or detection range inside region) Din from the outside of the weak voltage detection range (also referred to as weak voltage detection range outside region or detection range outside region) Dout (see FIG. 6) and the vehicle moving amount cvp (see FIG. 5) calculated based on the vehicle speed Vv obtained by the vehicle speed sensor 74 and the steering angle θs obtained by the steering angle sensor 78.

Furthermore, in the close-distance region Dn, the induced voltage in accordance with the relative moving speed between the power reception coil 12 and the power transmission coil 11 is generated; therefore, with reference to the vehicle speed induced voltage characteristic 206 as the map of the characteristic corresponding to the induced voltage that is obtained in advance from the vehicle speed Vv, the weak voltage value vlpe is obtained by correcting the offset of the weak voltage value vlpe. The weak voltage integrated value vilpe is a value obtained by integrating the corrected weak voltage value vlpe.

In addition, since the weak voltage value characteristic 202 changes depending on the z-axis height zh as the gap between the power reception coil 12 and the power transmission coil 11, the weak voltage value characteristic 202 is selected or corrected in consideration of the z-axis height zh. In addition, in order to avoid integrated errors, in a case where the vehicle speed Vv=0 at which the induced voltage is not generated, the weak voltage integrated value vilpe is reset to a value on the weak voltage integrated value characteristic 204 relative to the weak voltage value vlpe at a vehicle speed Vv=0, that is, a reference value on the basis of the current weak voltage value vlpe and the weak voltage integrated value vilpe.

In this case, each of the very-close-distance region Dc, the close-distance region Dn, and the far-distance region Df is determined based on the current weak voltage integrated value vilpe, and for each region, the value on the weak voltage integrated value characteristic 204 corresponding to the value of the weak voltage value vlpe, that is, a reference value may be assigned as the weak voltage integrated value vilpe that has been reset, so that the weak voltage integrated value vilpe is reset.

Second Example

[Identification Determination of Weak Voltage Detection Range Outside Region Dout and Weak Voltage Detection Range Inside Region Din]

In this embodiment as described above, the moving amount xvp of the power reception coil 12 on the x-axis from the initial position xint where the weak voltage value vlpe is received first, in other words, the x-axis position (distance) x from the origin o of the power transmission coil 11 is calculated.

Therefore, in the detection range outside region Dout, the parameters such as the weak voltage integrated value vilpe and the x-axis moving amount xvp are reset. When the vehicle 20 enters the detection range inside region Din (at the time of entry from the outside of the detection range to the inside of the detection range), the parameters such as the weak voltage integrated value vilpe and the x-axis moving amount xvp are reset and initialization to set the initial position xint is performed, and the calculation of the weak voltage integrated value vilpe and the x-axis moving amount xvp is started.

In the detection range outside region Dout, the weak voltage value vlpe remains at a lower limit value (some random noise and offset are mixed). Even in the detection range inside region Din, the weak voltage value vlpe becomes the lower limit value at the bottom position xb. Therefore, the weak voltage detection range inside/outside region cannot be determined accurately by using only the weak voltage value vlpe.

In the detection range inside region Din, the weak voltage value vlpe exceeds zero except at the bottom position xb. Therefore, a voltage that slightly exceeds zero, that is, a voltage approximately corresponding to the bottom peak value vlpeth described above is set as a weak voltage threshold {referred to as weak voltage threshold vlpeth with same reference symbol because the value is substantially the same (see FIG. 6)}.

In view of the above, if the weak voltage value vlpe is more than or equal to the weak voltage threshold vlpeth, the region is determined to be the detection range inside region Din. Note that since a filter process removes the noise and the offset, 0+ value (positive value close to zero) is set as the weak voltage threshold vlpeth.

When the weak voltage value vlpe is less than or equal to the weak voltage threshold vlpeth and the vehicle 20 is in the stop state (Vv=0), it cannot be determined whether a position is within the detection range outside region Dout or is the bottom position xb. Therefore, a parameter value (for example, weak voltage integrated value vilpe) that is detected before is held without being reset.

Furthermore, in a case where the weak voltage value vlpe is less than or equal to the weak voltage threshold vlpeth and the vehicle 20 is traveling (Vv≠0), if a period where the time differential value vdtlpe of the weak voltage value vlpe expressed in the following expression (6) is zero has continued for a threshold time Tth, the region is determined to be the detection range outside region Dout and the parameter is reset.

$$vdtlpe = d(vlpe)/dt \qquad (6)$$

Here, the time differential value vdtlpe is calculated by the time differentiation unit 106t as a minute changing amount d(vlpe) of the weak voltage value vlpe relative to the changing amount of the minute time dt measured by a timer (clocking unit) that is not shown.

Furthermore, in a case where the weak voltage value vlpe is less than or equal to the weak voltage threshold vlpeth and the vehicle 20 is traveling (Vv≠0), if the weak voltage time differential value vdtlpe is changed to vdtlpe≠0, the region is determined to be the detection range inside region Din.

The x-axis position x may be calculated based on the initial position xint when the vehicle 20 enters the detection range inside region Din from the detection range outside region Dout, and the vehicle moving amount cvp calculated by the vehicle speed sensor 74 and the steering angle sensor 78; then, positive/negative of the x position may be determined based on the calculated x-axis position.

Third Example

[Procedure of Calculating X-Axis Moving Amount xvp]

Figure 9:
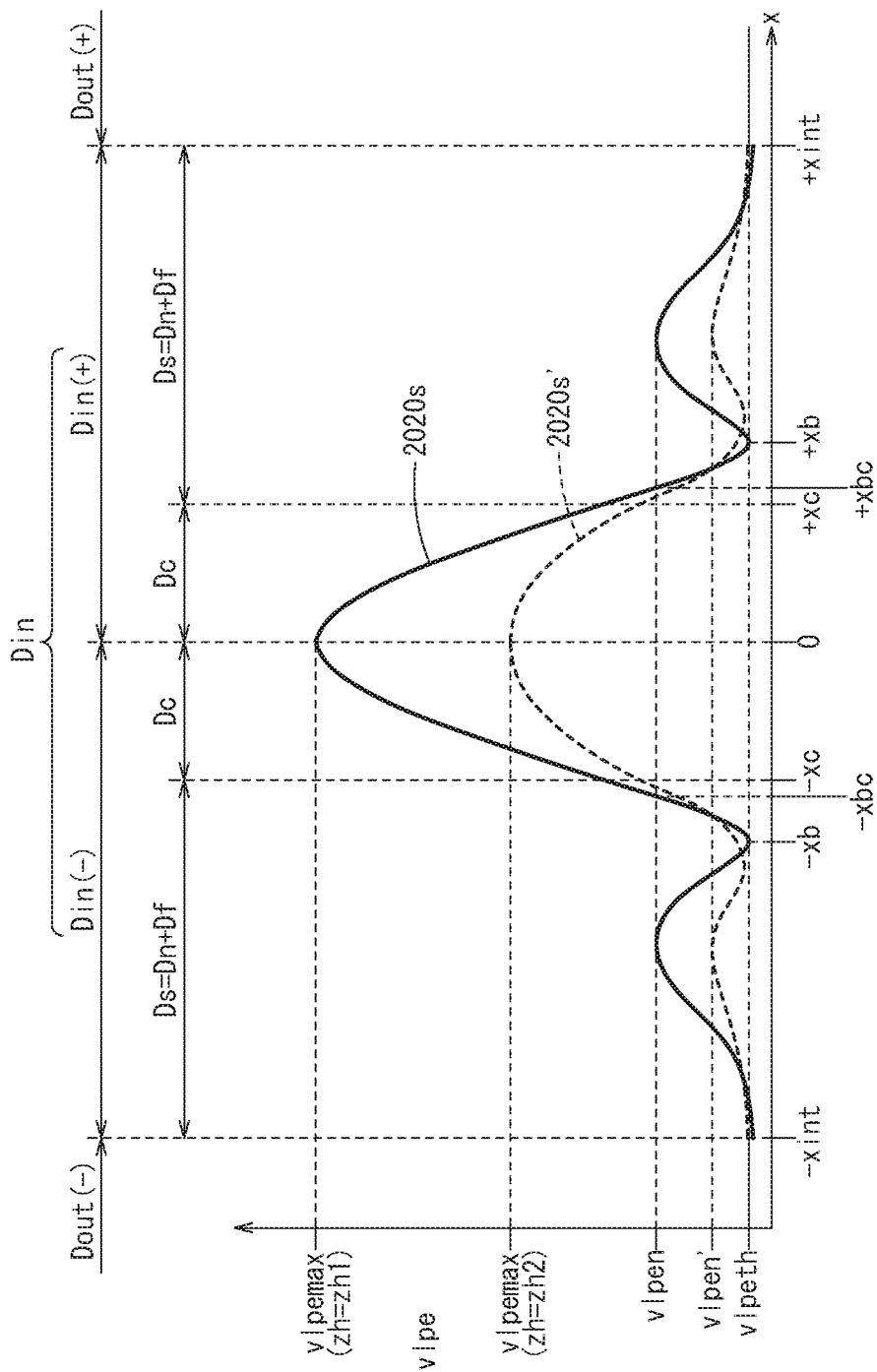
FIG. 9 is a characteristic explanatory diagram in which the weak voltage value characteristic is drawn to both positive and negative sides of an origin.

FIG. 9 expresses the weak voltage value characteristic 2020s (z-axis height zh is zh1) and a weak voltage value characteristic 2020s' (z-axis height zh is zh2, zh2>zh1) that are drawn to both positive and negative sides of the origin o of the x-axis.

The weak voltage value characteristic 2020s' is the characteristic when the z-axis height zh is zh2 that is higher than zh1. The weak voltage vlpe is a low value in the entire detection range inside region Din.

For example, when the vehicle 20 enters the detection range inside region Din(+) from the detection range outside region Dout(+), the weak voltage position differential value vdplpe expressed in the expression (3) transits from zero (vdplpe=0) to non-zero (vdplpe≠0).

Figure 10B:
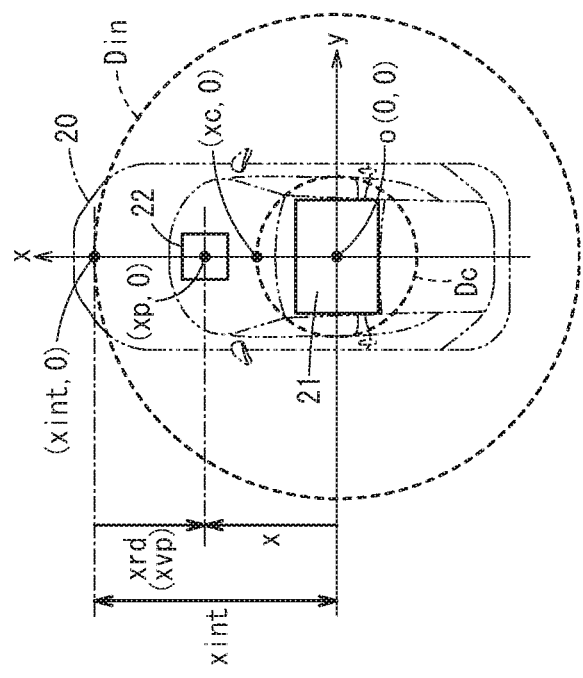
FIG. 10B is a schematic plan view illustrating the vehicle at a position in the middle of positioning.
Figure 10A:
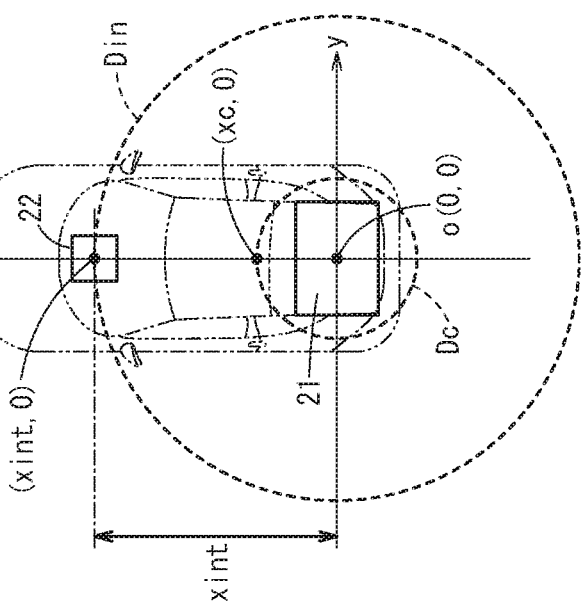
FIG. 10A is a schematic plan view illustrating the vehicle at an initial position.

As illustrated in FIG. 10A, a position where the weak voltage position differential value vdplpe transits from zero to non-zero is set as the initial position xint.

As illustrated in FIG. 10B, the x-axis position (distance x) can be obtained by subtracting the moving amount xvp from the initial position xint(xint, 0). Note that, in this third example, it is assumed that the y-axis moving amount is very small and can be ignored.

In the third example, the x-axis moving amount xvp is calculated by ∫Vv·dx or vehicle speed Vv×required time, for example, Vvtar×required time, from the initial position xint(xint, 0) to the very-close-distance threshold position +xbc or the very-close-distance threshold position xc(xc, 0) that has a little margin relative to the very-close-distance threshold position +xbc where the weak voltage value vlpe becomes the side peak value (vlpen) the second time. The x-axis moving amount xvp is calculated with reference to the weak voltage value characteristic 2020 (2020s or 2020s') of the very-close-distance region Dc from the position (very-close-distance threshold position+xbc) where the weak voltage value vlpe becomes the side peak value (vlpen) the second time to the origin o(0, 0), or the very-close-distance threshold position xc(xc, 0).

Therefore, the power reception coil 12 of the vehicle 20 can be positioned certainly with a simple structure from the initial position (initial detection position) of the weak power+xint to the position at the maximum peak value vlpemax (maximum peak value detection position).

Note that in FIG. 9, another side peak value vlpen' indicates the side peak value of the weak voltage value characteristic 2020s'.

Fourth Example

[Outline of Positive/Negative Determination of X-Axis]

A relative front/rear position (positive/negative position) of the power reception coil 12 to the power transmission coil 11 is estimated based on the shift position Sp, the weak voltage value vlpe, the weak voltage integrated value vilpe with respect to the vehicle displacement, and the weak voltage position differential value vdplpe with respect to the vehicle displacement. The details will be described below with reference to flowcharts described later (step S3 in FIG. 14, FIG. 17).

Positive/negative at the initial position xint is determined based on the shift position Sp when the vehicle 20 enters the detection range inside region Din from the detection range outside region Dout.

In the close-distance region Dn and the far-distance region Df, positive/negative of the x-axis is determined based on the weak voltage integrated value vilpe.

In the very-close-distance region Dc, it is estimated whether the power reception coil 12 approaches or is separated from the power transmission coil 11 depending on whether the differential value of the weak voltage value vlpe with respect to the vehicle displacement, that is, the weak voltage position deferential value vdplpe is positive or negative. Positive/negative of the x-axis position is determined by determining whether the vehicle 20 moves forward or backward on the basis of the shift position Sp.

Fifth Example

[Estimation of Y-Axis Moving Amount]

Figure 11:
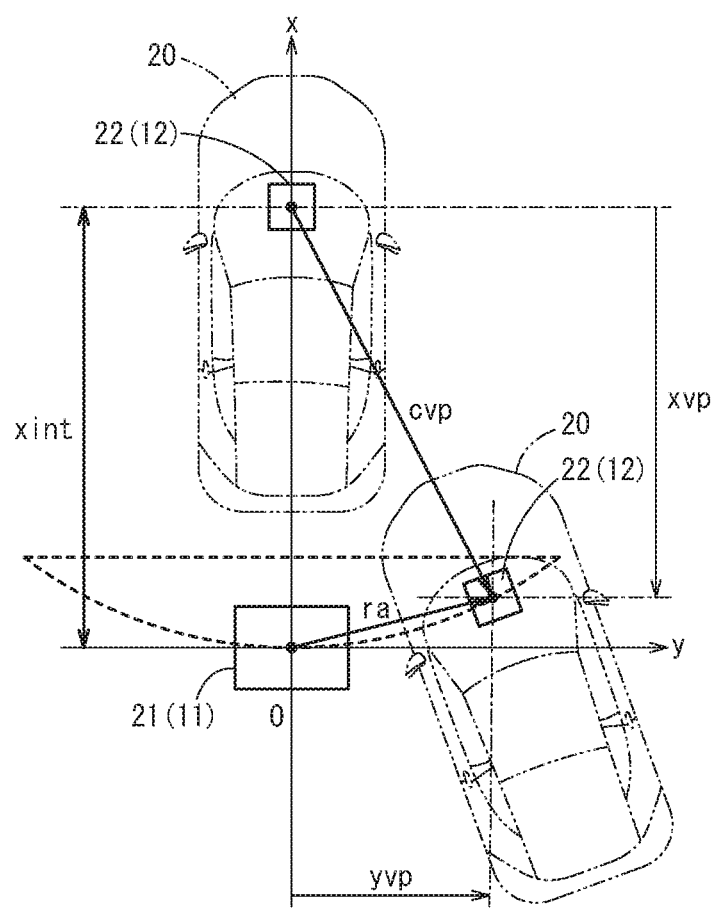
FIG. 11 is a schematic plan view for describing a process of estimating a y-axis moving amount from a vehicle moving amount.
Figure 12:
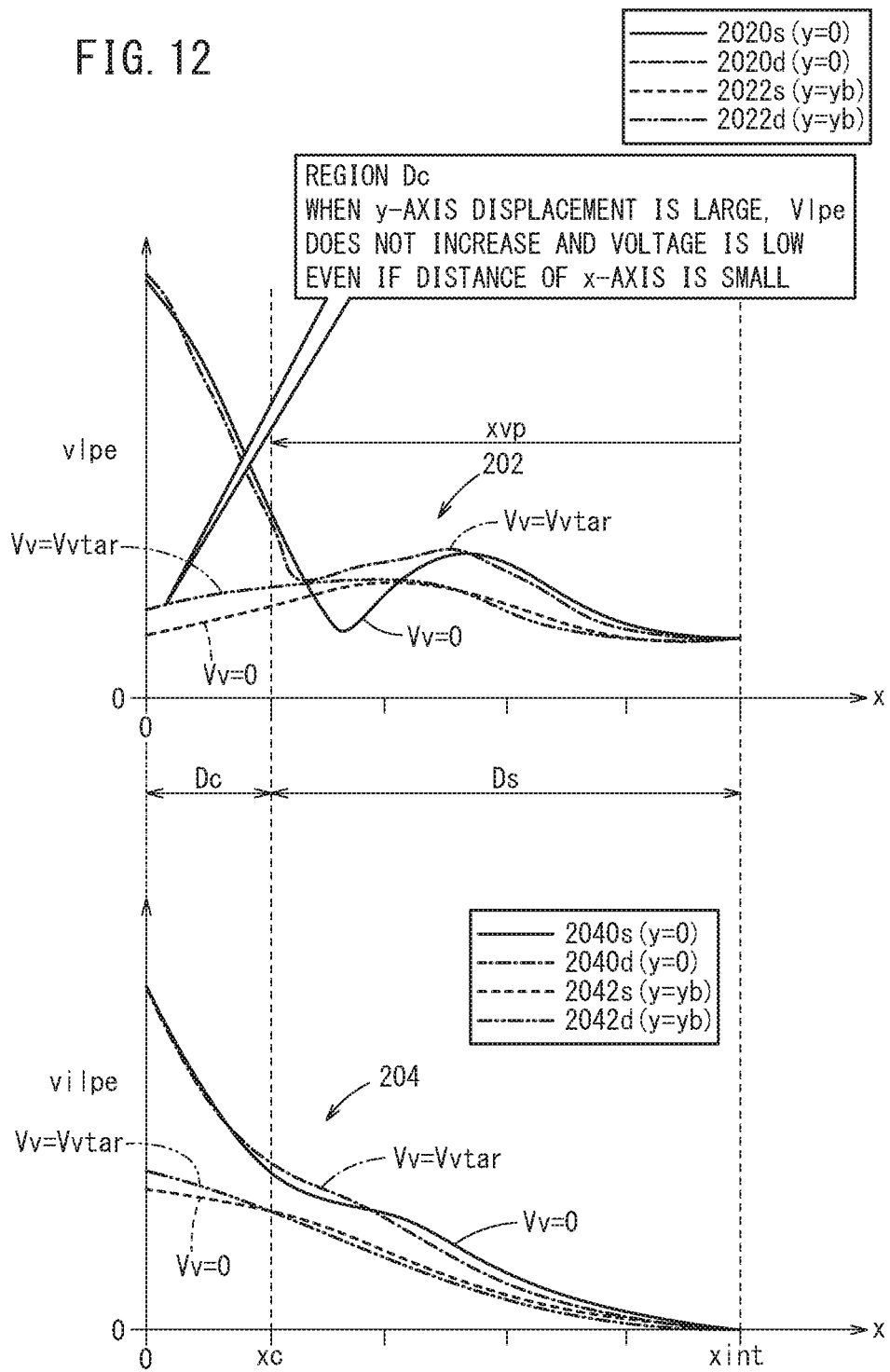
FIG. 12 is a characteristic explanatory diagram for describing the process of estimating the y-axis moving amount from the vehicle moving amount.

In a case where it is presumed that the vehicle 20 is in the very-close-distance region Dc on the basis of the vehicle moving amount xvp in FIG. 11 and the weak voltage value vlpe in FIG. 12, a y-axis direction distance (y-axis moving amount) yvp is estimated.

In FIG. 12, the weak voltage value characteristic 2020s shown by a solid line in the weak voltage value characteristics 202 is the characteristic on the x-axis when a y-axis value y=0 [mm] and the vehicle speed Vv=0 [mm/s].

A weak voltage value characteristic 2022s shown by a dashed line is the characteristic on the x-axis when the y-axis value y=yb (yb>ya) [mm] and the vehicle speed Vv=0 [mm/s].

The weak voltage value characteristic 2020d shown by a one-dot chain line is the characteristic when the y-axis value y=0 [mm] and the vehicle speed Vv is the target vehicle speed Vvtar (Vv=Vvtar [mm/s]) that is constant and slow.

A weak voltage value characteristic 2022d shown by a two-dot chain line is the characteristic on the x-axis when the y-axis value y=yb [mm] and the vehicle speed Vv is the target vehicle speed Vvtar [mm/s] that is constant and slow.

Characteristics 2040s, 2040d, 2042s, 2042d are the weak voltage integrated value characteristics corresponding to the characteristics 2020s, 2020d, 2022s, 2022d, respectively.

In a case where it is presumed that the vehicle 20 is in the very-close-distance region Dc, if a displacement of the y-axis direction distance is within ya, the weak voltage value vlpe increases as the x-axis moving amount xvp increases. However, when the deviation in the y-axis direction is large, for example y=yb>ya, the weak voltage value vlpe decreases as the x-axis moving amount xvp increases.

Therefore, the y-axis moving amount yvp is obtained from the x-axis moving amount xvp in FIG. 11, for example, xvp=vehicle speed Vv×required time, and the characteristics 202, 204 shown in FIG. 12. Note that whether the y-axis moving amount yvp is positive or negative is determined on the basis of the steering angle θs of the vehicle 20.

Sixth Example

[Procedure of Obtaining X-Axis Position x and Y-Axis Position y]

Figure 13:
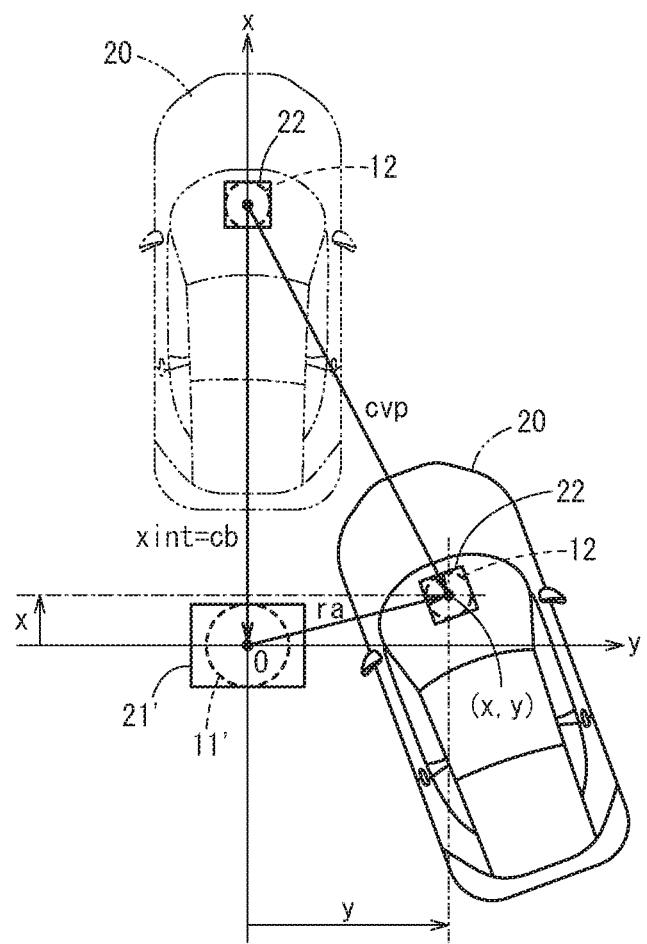
FIG. 13 is an explanatory view for obtaining position coordinates of the vehicle by expressions.

As illustrated in FIG. 13, when a current coordinate position ra(x, y) is obtained on the assumption that a power transmission coil in a power transmission pad 21' is a power transmission coil 11' with a circular shape, the vehicle moving amount cvp is calculated from the vehicle speed Vv as expressed in the following expression (7).

$$cvp = \int Vv \cdot dt \quad (7)$$

The following expressions (8), (9) are obtained from the Pythagorean theorem.

$$y^2 + x^2 = ra^2 \quad (8)$$

$$y^2 + (cb-x)^2 = cvp^2 \quad (9)$$

where ra is the magnitude of a vector obtained from the weak voltage value vlpe satisfying y<ya with reference to the weak voltage value characteristic 202, and cb is equal to the initial position (initial distance) xint.

By solving the expressions (8), (9) with respect to x, y, the following expressions (10), (11) are obtained. On the basis of the expressions (10), (11), the current coordinate position (radius) ra(y, x) can be obtained.

$$x = (ra^2 - cvp^2 + cb^2)/2 \cdot cb \quad (10)$$

$$y = \{(ra+cb+cvp)(ra-cb+cvp)(ra+cb-cvp)(-ra+cb+cbp)\}^{1/2}/2 \cdot cb \quad (11)$$

[Description of Operation in Accordance with Flowchart]

Next, with reference to the flowcharts, description is made of the positioning process of the power reception pad (power reception coil 12) of the vehicle 20 relative to the power transmission pad 21 (power transmission coil 11) of the charging station 30, in other words, a detection process (calculation process) of the relative position of the power reception coil 12 to the power transmission coil 11.

Figure 14:
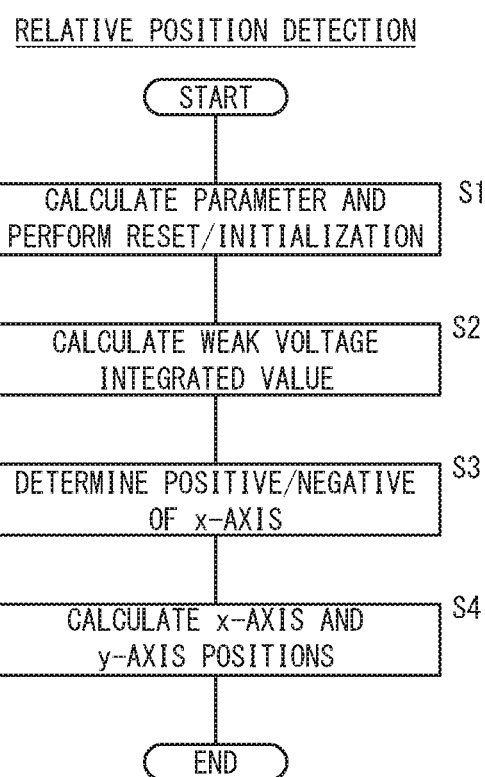
FIG. 14 is an overall flowchart of a relative position detection process.

FIG. 14 is an overall flowchart of a relative position detection process. Note that it is the ECU 60 that executes programs in the flowcharts, and in order to avoid the complication, some of the description is omitted. The overall flowchart is repeatedly performed in a minute time, for example, in the minute time dt described above.

In step S1, the ECU 60 performs parameter calculation, a reset process of the calculated parameters, and an initialization process.

The parameters are basically the moving amount cvp of the vehicle 20 and the weak voltage integrated value vilpe. Note that if the y-axis moving amount is very small and can be ignored, the moving amount cvp may be the x-axis relative moving amount (x-axis moving amount) xvp. In the initialization process, the initialization of the current position ra(x, y) is performed, that is, a process to achieve cvp(x, y)=xint(xint, 0) is performed.

In step S2 after the reset/initialization process, the ECU 60 performs a calculation process of the weak voltage integrated value vilpe on the basis of the detected weak voltage value vlpe.

Next, in step S3, positive/negative of the x-axis is determined.

In step S4, on the basis of the weak voltage value vlpe and the weak voltage integrated value vilpe, the detection process (calculation process) is performed. This detection process (calculation process) detects the relative position of the power reception pad (power reception coil 12) as the power reception unit of the vehicle 20 to the power transmission pad 21 (power transmission coil 11) as the power transmission unit of the charging station 30.

Figure 15:
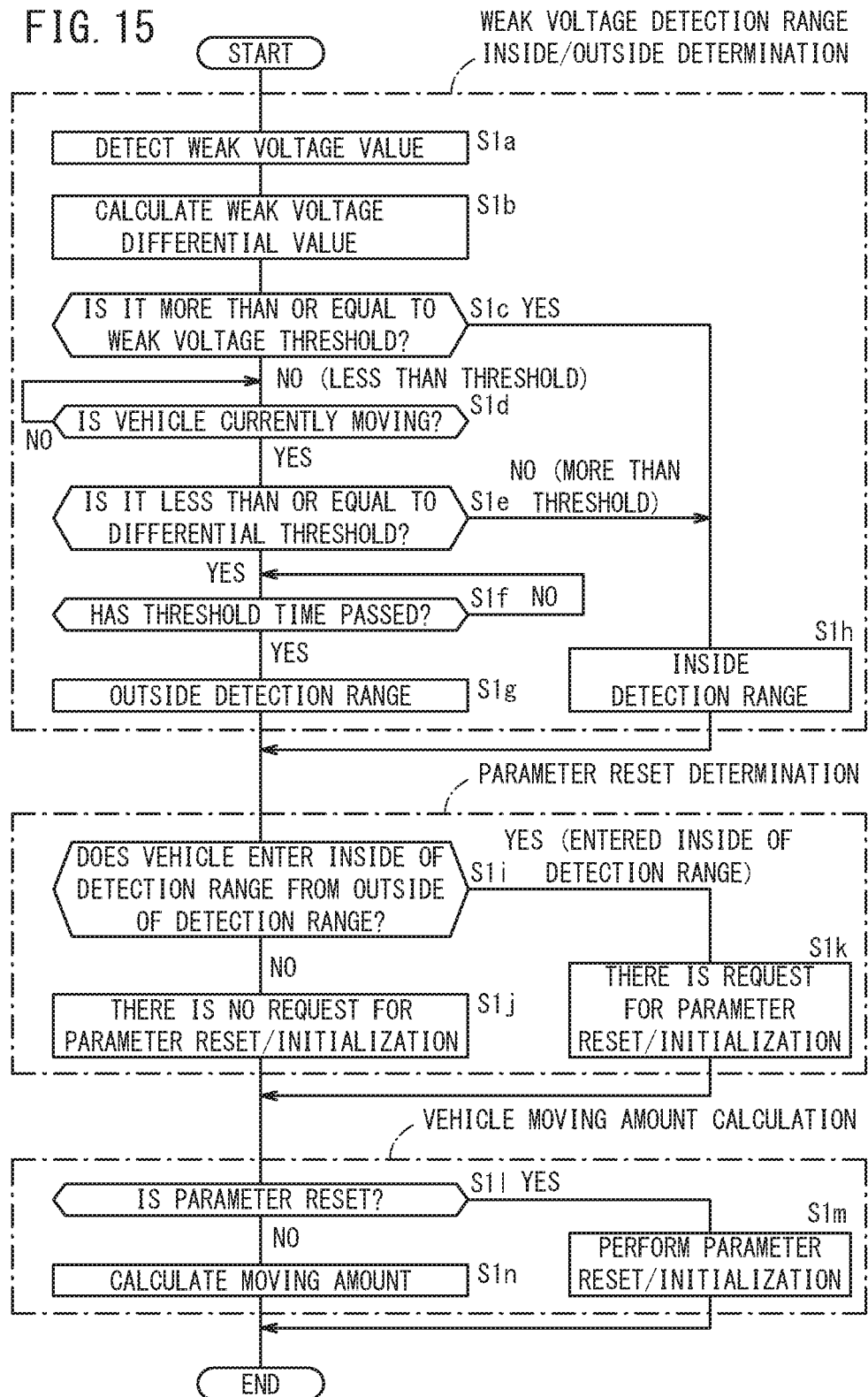

FIG. 15 is a detailed flowchart of the process in step S1 used for an explanation of the calculation of the vehicle moving amount cvp as a parameter, the reset process/initialization process of the vehicle moving amount cvp and the weak voltage integrated value vilpe, and the like.

In step S1a, the voltage value detection unit 102 of the ECU 60 (see FIG. 4) detects the weak voltage value vlpe through the voltage sensor 52. Note that when the weak voltage value vlpe is detected, a filter process is performed in order to remove a noise, detect and remove an offset, and the like.

Next, in step S1b, the position differentiation unit 106p and the time differentiation unit 106t of the differentiation unit 106 calculate the position differential value vdplpe and the time differential value vdtlpe of the weak voltage value vlpe, respectively.

Next, in step S1c, the significance determination unit 104 determines whether the detected weak voltage value vlpe is more than or equal to the weak voltage threshold vlpeth.

In the first determination, since the vehicle 20 is within the detection range outside region Dout, the weak voltage value vlpe is less than the weak voltage threshold vlpeth; the determination is negative (step S1c: NO).

Next, in step S1d, the ECU 60 detects the vehicle speed Vv using the vehicle speed sensor 74 and determines whether the vehicle 20 is moving (during displacement). If the vehicle 20 is moving, in step S1e, the ECU 60 determines whether the position differential value vdplpe and/or the time differential value vdtlpe is less than or equal to a threshold (position differential threshold dpth, time differential threshold dtth), as expressed in the following expressions (12) and (13).

$$vdplpe \le dpth \quad (12)$$

$$vdtlpe \le dtth \quad (13)$$

In step S1e, if at least one determination is positive (step S1e: YES), it is determined whether the threshold time Tth of a minute time has passed in step S1f. If the threshold time Tth has passed (step S1f: YES), the detection range inside/outside determination unit 108 determines that the power reception coil 12 of the vehicle 20 is within the detection range outside region Dout (out of detection range) in step S1g.

On the other hand, if the weak voltage value vlpe is more than or equal to the weak voltage threshold vlpeth in the determination of step S1c described above (step S1c: YES) or at least one differential value exceeds the threshold in the determination of step S1e (step S1e: NO), the detection range inside/outside determination unit 108 determines that the power reception coil 12 of the vehicle 20 is within the detection range inside region Din (within detection range) in step S1h.

Next, in step S1i, the initial position/parameter setting unit 112 determines whether the power reception coil 12 of the vehicle 20 enters (transits to) the detection range inside region Din from the detection outside region Dout.

In a case where the entry (transition) does not occur (step S1i: NO), in other words, in a case where the power reception coil 12 of the vehicle 20 remains within the detection range outside region Dout or the detection range inside region Din, the initial position/parameter setting unit 112 determines that there is no parameter reset request in step S1j.

On the other hand, in a case where the entry (transition) occurs (step S1i: YES), in other words, in a case where the power reception coil 12 of the vehicle 20 enters (transits to) the detection range inside region Din from the detection range outside region Dout, the initial position/parameter setting unit 112 determines that there are a parameter reset request and an initialization request in step S1k.

Next, in step S1l, if there are the parameter reset request and the initialization request (step S1l: YES), the initial position/parameter setting unit 112 resets the weak voltage integrated value vilpe to zero and performs the initialization process to set the moving amount cvp to the initial position xint(xint, 0) in step S1m.

In step S1l, if there are not the parameter reset request and the initialization request (step S1l: NO), the moving amount detection unit 110 obtains an X-axis moving amount component and a Y-axis moving amount component of the moving amount cvp of the vehicle 20 on the basis of, for example, the vehicle speed Vv, vehicle information such as a wheel base length, the steering angle θs in step S1n, on the assumption that the traveling speed is very slow.

Note that the moving amount cvp can be obtained by using a positioning device such as a GPS device or by using an inertial navigation.

Figure 16:
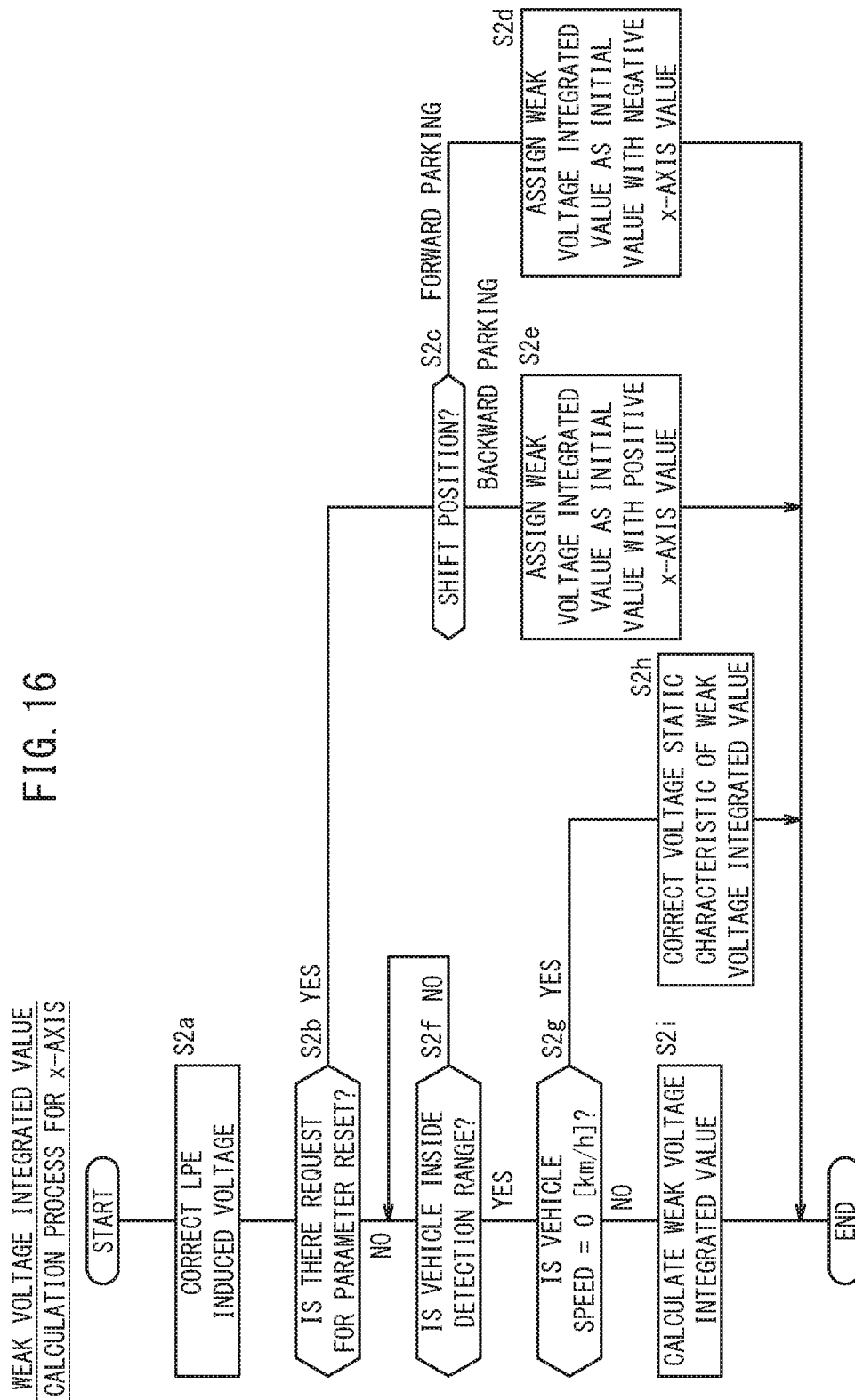
FIG. 16 is a detailed flowchart for describing a calculation process of the weak voltage integrated value.

FIG. 16 is a detailed flowchart of the process in step S2 used for an explanation of the calculation process of the weak voltage integrated value vilpe.

In step S2a, in a case where the power reception coil 12 is within the close-distance region Dn (see FIG. 6), the weak voltage value vlpe is corrected (LPE induced voltage correction) in consideration of an influence of the induced voltage generated due to the vehicle speed Vv.

Next, in step S2b, it is determined whether there are the parameter reset/initialization requests. If there are the parameter reset/initialization requests (step S2b: YES), moreover, the positive/negative determination unit 118 determines whether parking is forward parking or backward parking with reference to the shift position Sp obtained by the shift position sensor 79, in step S2c.

In the forward parking, the weak voltage integrated value calculation unit 115 assigns the weak voltage integrated value vilpe as an initial value of the integrated value with a value on the x-axis set to be negative in step S2d.

In the backward parking, the weak voltage integrated value calculation unit 115 assigns the weak voltage integrated value vilpe as the initial value of the integrated value with a value on the x-axis set to be positive in step S2e.

In the determination in step S2b, if there are not the parameter reset/initialization requests, the weak voltage integrated value calculation unit 115 confirms that the power reception coil 12 of the vehicle 20 is within the detection range inside region Din in step S2f. After that, in step S2g, the weak voltage integrated value calculation unit 115 determines whether the vehicle speed Vv is 0 [km/h]. If the vehicle 20 is in the stop state (step S2g: YES), a voltage static characteristic correction process of the weak voltage integrated value vilpe is performed in step S2h.

In this voltage static characteristic correction process, in order to eliminate the error integrated in the weak voltage integrated value vilpe and reset, each of the very-close-distance region Dc, the close-distance region Dn, and the far-distance region Df is determined based on the current weak voltage integrated value vilpe, and for each region, the value on the weak voltage integrated value characteristic 204 corresponding to the current value of the weak voltage value vlpe, that is, a reference value is assigned as the weak voltage integrated value vilpe that is a reset value.

In the determination in step S2g, if the vehicle speed Vv is not zero and the vehicle 20 is traveling (step S2g: NO), the weak voltage integrated value calculation unit 115 calculates the weak voltage integrated value vilpe in step S2i.

Note that in consideration that the vehicle 20 starts to travel from the stop state in the detection range inside region Din, a backup value held when the vehicle speed Vv was zero previously is used as a value of the weak voltage integrated value vilpe.

Figure 17:
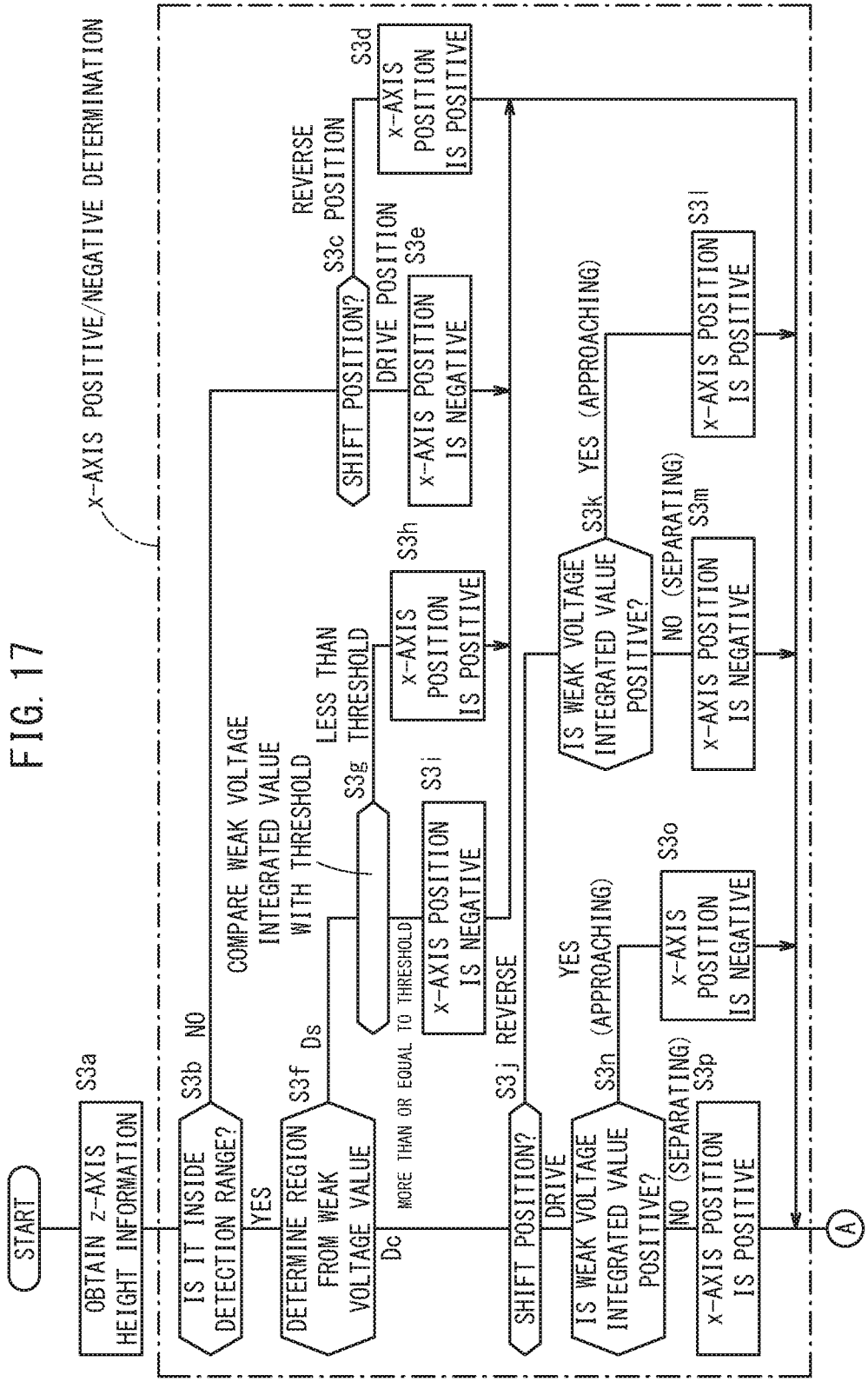
FIG. 17 is a detailed flowchart (1/2) for describing a detection process (calculation process) of a relative position of the power reception pad to the power transmission pad.
Figure 18:
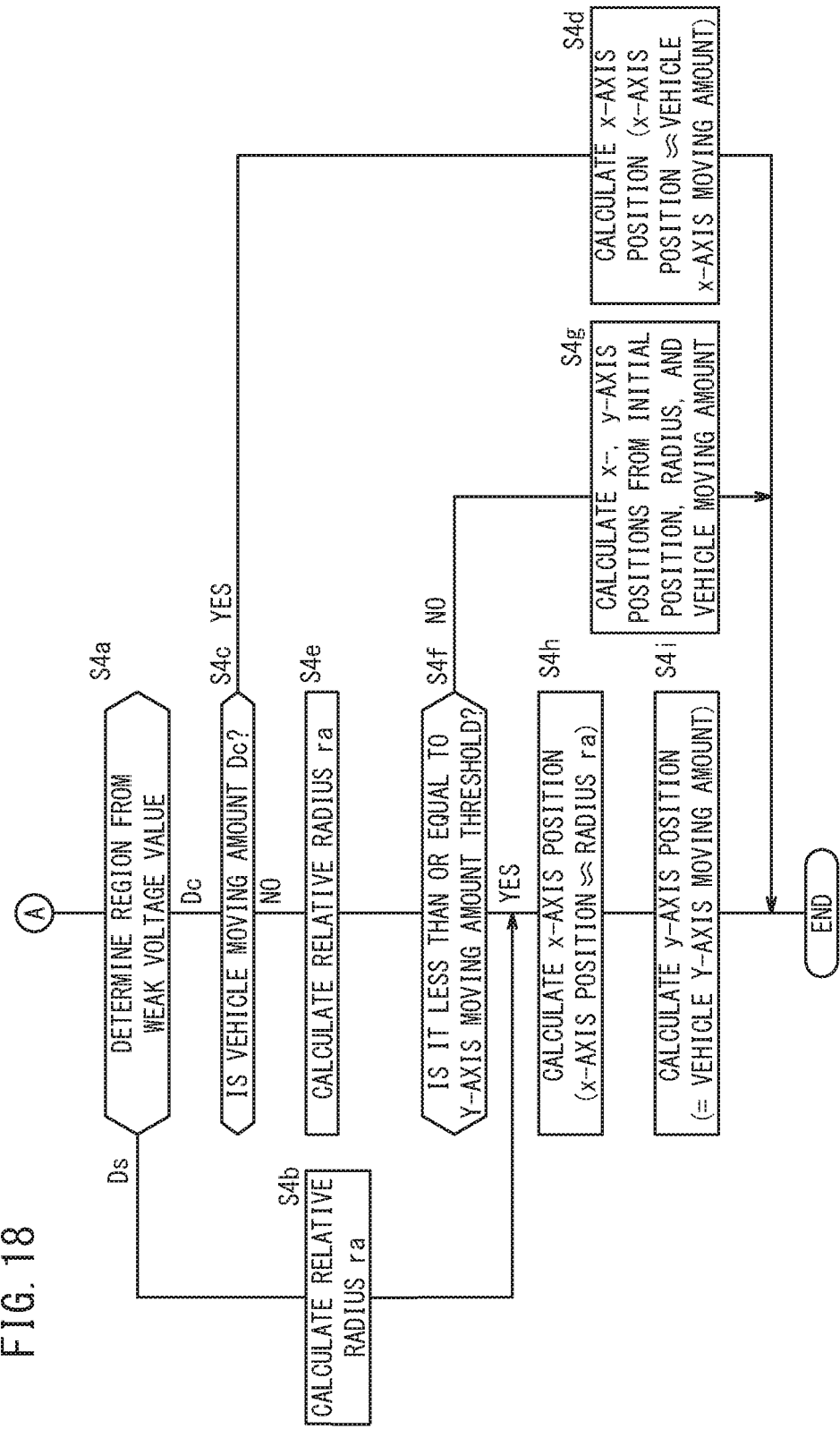
FIG. 18 is the detailed flowchart (2/2) for describing the detection process (calculation process) of the relative position of the power reception pad to the power transmission pad.

FIG. 17 and FIG. 18 are detailed flowcharts (1/2 and 2/2) used for an explanation of the x-axis positive/negative determination process for the power reception pad (power reception coil 12) relative to the power transmission pad 21 (power transmission coil 11) in step S3 and the detection process (calculation process) of the relative position in step S4, respectively.

In step S3a in FIG. 17, information of the z-axis height zh between the charging station 30 and the power reception coil 12 is obtained and the weak voltage value characteristic 202 suitable for the z-axis height zh is set (selected), for example.

In step S3b, the positive/negative determination unit 118 checks a detection range inside/outside determination result (flag in programs) obtained in steps S1g, S1h described above.

In a case where the power reception coil 12 is not in the detection range inside region Din (step S3b: NO), that is, in a case where the power reception coil 12 is within the detection range outside region Dout, in step S3c, the positive/negative determination unit 118 checks the determination result of the shift position Sp in step S2c. If the shift position Sp is the reverse position R, it is determined that the x-axis position of the power reception coil 12 is "positive" in step S3d. If the shift position Sp is the drive position D, it is determined that the x-axis position of the power reception coil 12 is "negative" in step S3e.

On the other hand, in step S3b, if it is determined that the power reception coil 12 is within the detection range inside region Din (step S3b: YES), it is determined whether the power reception coil 12 is within the very-close-distance region Dc or within the separation distance region Ds in step S3f.

In the determination in step S3f, for example, if the detected weak voltage value vlpe is more than or equal to the weak voltage value (threshold) vlpec (see FIG. 6), it is determined that the power reception coil 12 is within the very-close-distance region Dc. If the detected weak voltage value vlpe is less than the weak voltage value (threshold) Vlpec, it is determined that the power reception coil 12 is within the separation distance region Ds.

If the power reception coil 12 is within the separation distance region Ds, in step S3g, it is determined whether the weak voltage integrated value vilpe is less than, or more than or equal to the weak voltage integrated value (threshold) vilpec (see FIG. 6).

If the weak voltage integrated value vilpe is less than the weak voltage integrated value (threshold) vilpec, the positive/negative determination unit 118 determines that x-axis position is "positive" in step S3h. If the weak voltage integrated value vilpe is more than or equal to the weak voltage integrated value (threshold) vilpec, the positive/negative determination unit 118 determines that the power reception coil 12 is within the separation distance region Ds (see FIG. 9) on a side where the vehicle 20 (power reception coil 12) has passed by the origin o of the power transmission coil 11 and the x-axis position is "negative" in step S3i.

In the determination in step S3f, if it is determined that the power reception coil 12 is within the very-close-distance region Dc, in order to determine positive/negative in the very-close-distance region Dc, it is determined whether the shift position Sp is the reverse position R or the drive position D in step S3j.

If the shift position Sp is the reverse position R, it is determined whether at least one of the weak voltage position differential value vdplpe and the weak voltage time differential value vdtlpe is a positive value in step S3k. If the value is positive, it is determined that the x-axis position is "positive" in step S3l since the power reception pad 22 (power reception coil 12) is approaching the power transmission pad 21 (power transmission coil 11). If the value is negative, it is determined that the x-axis position is "negative" in step S3m since the power reception pad 22 (power reception coil 12) has passed and is going away from the power transmission pad 21 (power transmission coil 11).

In the determination in step S3j, if the shift position Sp is the drive position D, it is determined whether at least one of the weak voltage position differential value vdplpe and the weak voltage time differential value vdtlpe is a positive value in step S3n. If the value is positive, it is determined that the x-axis position is "negative" in step S3o since the power reception pad 22 (power reception coil 12) is approaching the power transmission pad 21 (power transmission coil 11). If the value is negative, it is determined that the x-axis position is "positive" in step S3p since the power reception pad 22 (power reception coil 12) has passed and is going away from the power transmission pad 21 (power transmission coil 11).

Next, in step S4a of the flowchart in FIG. 18, the relative position calculation unit 116 determines whether the power reception coil 12 is within the very-close-distance region Dc or the separation distance region Ds in a manner similar to that of the determination process in step S3f.

If it is determined that the power reception coil 12 is within the separation distance region Ds, the relative radius ra (see FIG. 11, etc.) is calculated with reference to the weak voltage value characteristic 202 and the weak voltage integrated value characteristic 204 by using the weak voltage value vlpe and the weak voltage integrated value vilpe as arguments, respectively, in step S4b.

If it is determined that the power reception coil 12 is within the very-close-distance region Dc in step S4a, moreover, it is determined whether the vehicle moving amount cvp shown in FIG. 11 is within the very-close-distance region Dc in step S4c. If the vehicle moving amount cvp is within the very-close-distance region Dc, the x-axis moving amount xvp is calculated based on the weak voltage value vlpe in step S4d. If the vehicle moving amount cvp is out of the very-close-distance region Dc, the relative radius ra is calculated based on the weak voltage vlpe in step S4e.

Note that, in step S4d, the y-axis position is estimated with reference to the weak voltage value characteristic 202 shown in FIG. 12 as described in the fifth example.

Next, in step S4f, it is determined whether the y-axis moving amount yvp is less than or equal to a threshold. If the y-axis moving amount yvp is not less than or not equal to the threshold (step S4f: NO), the xy-axis position ra(x, y) is calculated, e.g., using the expressions (10) and (11) on the basis of the initial position xint, the relative radius ra, and the moving amount cvp of the vehicle 20 in step S4g.

In the determination in the step S4f, if the Y-axis moving amount yvp of the vehicle is less than or equal to the threshold (step S4f: YES), the x-axis position x is calculated (x-axis position x is approximated to relative radius ra) in step S4h, and the y-axis position is calculated as a Y-axis moving amount ybp of the vehicle (see FIG. 11, FIG. 12) in step S4i.

[Summary and Modification]

As described above, the aforementioned non-contact power transmission system 10 includes the charging station 30 including the power transmission coil 11 as the power transmission unit configured to transmit the weak power for positioning, and the vehicle 20 including the power reception coil 12 as the power reception unit configured to receive the weak power without contact.

The ECU 60 as the control unit of the vehicle 20 includes the voltage value detection unit 102 configured to detect the weak voltage value vlpe corresponding to the amount of the weak power received by the power reception coil 12, the moving amount detection unit 110 configured to detect the moving amount cvp (xvp) of the vehicle 20; and the moving direction detection unit 111 configured to detect the moving direction of the vehicle 20. The position of the power reception coil 12 relative to the power transmission coil 11 is detected on the basis of the weak voltage value vlpe, the moving amount cvp (xvp), and the moving direction that are detected.

In this manner, on the basis of the detected weak voltage value vlpe, the distance (radial distance) from the power transmission coil 11 to the power reception coil 12 is detected, and moreover the moving amount cvp (xvp) and the moving direction of the vehicle 20 are detected. Thus, the two-dimensional relative position of the power reception unit (power reception coil 12) to the power transmission unit (power transmission coil 11) can be accurately detected.

In this case, the ECU 60 of the vehicle 20 further includes the significance determination unit 104 configured to determine whether the weak voltage value vlpe detected by the voltage value detection unit 102 is significant; and the initial position/parameter setting unit 112, wherein when the voltage value detected by the voltage value detection unit 102 has increased from zero while the vehicle 20 travels toward the power transmission coil 11 in order to detect the weak power, the significance determination unit 104 is configured to determine that the weak voltage value vlpe is significant.

In addition, the initial position/parameter setting unit 112 is configured to set the position at which it is determined that the weak voltage value vlpe is significant as the initial position xint of the power reception coil 12 for positioning, and reset the moving amount or the like as the parameter.

In this manner, the distance from the power transmission coil 11 where the weak voltage value vlpe becomes significant is obtained in advance relative to the power reception coil 12 with a predetermined z-axis height zh (a distance between power transmission coil 11 and power reception coil 12 when centers thereof coincide with each other in plan view) and a predetermined shape; therefore, when the weak voltage value vlpe is detected, the detected position is set to the initial position xint of the power reception coil 12 for positioning and the parameter is reset (set to zero). After that, the vehicle 20 is driven toward the center of the power transmission coil 11 by a known distance so that the power reception coil 12 is moved; thus, the vehicle 20 can be positioned accurately at the position where the power reception efficiency of the main charging is the optimum (position where the center of the power reception coil 12 coincides with the center of the power transmission coil 11 in plan view).

In other words, the distance to the power transmission coil 11 is shortened while the position of the power reception coil 12 relative to the power transmission coil 11 is known, so that positioning can be performed certainly.

Moreover, the ECU 60 of the vehicle 20 further includes the significance determination unit 104 configured to determine whether the weak voltage value vlpe detected by the voltage value detection unit 102 is significant; the differentiation unit 106 as the initial position determining differentiation unit configured to obtain the differential value of the weak voltage value vlpe detected by the voltage value detection unit 102; and the initial position/parameter setting unit 112, wherein: the significance determination unit 104 is configured to determine that the weak voltage value vlpe is significant when the differential value of the voltage value detected by the voltage value detection unit 102, which is obtained by the differentiation unit 106, has increased from zero while the vehicle 20 travels toward the power transmission coil 11 in order to detect the weak power.

The initial position/parameter setting unit 112 is configured to set the position at which it is determined that the weak voltage value vlpe is significant as the initial position xint of the power reception coil 12 for positioning, and reset the parameter.

In this manner, since the distance from the power transmission coil 11 where the weak voltage value vlpe becomes significant is obtained in advance relative to the power reception coil 12 with the predetermined z-axis height zh and the predetermined shape; therefore, when the initial position determining differential value of the voltage value $d(vlpe)/dx$ or $d(vlpe)/dt$ has increased from zero, it is regarded that the weak voltage value vlpe is detected and the detected position is set to the initial position xint of the power reception coil 12 for positioning and the parameter is reset. After that, the vehicle 20 is driven toward the center of the power transmission coil 11 by a known distance so that the power reception coil 12 is moved; thus, the vehicle 20 can be positioned accurately at the position where the power reception efficiency of the main charging is the optimum (position where the center of the power reception coil 12 coincides with the center of the power transmission coil 11 in plan view).

In other words, the distance to the power transmission coil 11 is shortened while the position of the power reception coil 12 relative to the power transmission coil 11 is known, so that positioning can be performed certainly.

If the differential value is the time differential value d(vlpe)/dt, the significance can be determined and the initial position can be set during the travel, and if the differential value is the position differential value d(vlpe)/dx, the significance can be determined and the initial position can be set regardless of the vehicle speed Vv.

The ECU 60 further includes the weak voltage value characteristic storage unit 200v configured to store in advance the weak voltage value characteristic 202 expressing the correspondence relation between the weak voltage value vlpe and the radial distance from the power transmission coil 11 to the power reception coil 12, wherein the moving amount detection unit 110 can detect the distance x from the power transmission coil 11 to the power reception coil 12 by detecting the moving amount xvp from the initial position xint to the power reception coil 12 with reference to the weak voltage value characteristic 202 using the weak voltage value vlpe detected by the voltage value detection unit 102 as an argument.

In this manner, the weak voltage value characteristic 202 is referred to by using the detected weak voltage value vlpe as an argument and thus, the distance x from the power transmission coil 11 to the power reception coil 12 is detected. Therefore, the accurate position (distance) of the power reception coil 12 relative to the power transmission coil 11 can be calculated.

Furthermore, in the weak voltage value characteristic 202, the weak voltage value vlpe becomes the maximum value when the position of the power reception coil 12 coincides with the position of the power transmission coil 11; therefore, by stopping the vehicle 20 when the maximum value is detected, positioning can be terminated at the position where the power reception efficiency of the main charging is the optimum (maximum).

In addition, the ECU 60 further includes the weak voltage integrated value calculation unit 115 configured to calculate the weak voltage integrated value vilpe corresponding to the integrated value of the weak voltage value vlpe that is detected, and the weak voltage integrated value characteristic storage unit 200i configured to store in advance the weak voltage integrated value characteristic 204 expressing the correspondence relation between the weak voltage integrated value vilpe and the distance from the power transmission coil 11 to the power reception coil 12, wherein the distance x from the power transmission coil 11 to the power reception coil 12 is detected by detecting the moving amount xvp from the initial position xint with reference to the weak voltage integrated value characteristic 204.

Even if there is the place (position) in the route of the straight road connecting between the initial position xint and the power transmission coil 11 where the electromagnetic coupling degree between the power transmission coil 11 and the power reception coil 12 increases or decreases, the weak voltage integrated value vilpe monotonically increases because the weak voltage value vlpe is a positive value.

Therefore, by detecting the moving amount xvp from the initial position xint with reference to the weak voltage integrated value characteristic 204, the distance x from the power transmission coil 11 to the power reception coil 12 can be detected certainly.

The ECU 60 further includes the weak voltage integrated value calculation unit 115 configured to calculate the weak voltage integrated value vilpe corresponding to the integrated value of the weak voltage value vlpe that is detected, and the weak voltage integrated value characteristic storage unit 200i configured to store in advance the weak voltage integrated value characteristic 204 expressing the correspondence relation between the weak voltage integrated value vilpe and the distance from the power transmission coil 11 to the power reception coil 12, wherein in the very-close-distance region Dc of the power transmission coil 11 where the weak voltage value vlpe monotonically increases as the moving amount xvp increases, the distance from the power transmission coil 11 is calculated with reference to the weak voltage value characteristic 202, and in the separation distance region Ds that is farther than the very-close-distance region Dc and that includes the region where the weak voltage value vlpe does not increase monotonically although the moving amount xvp increases, the distance from the power transmission coil 11 is calculated with reference to the weak voltage integrated value characteristic 204.

In the separation distance region Ds including the close-distance region Dn where the weak voltage value vlpe in the weak voltage value characteristic 202 does not increase although the distance between the power transmission coil 11 and the power reception coil 12 becomes shorter, the distance to the power reception coil 12 can be detected with reference to the weak voltage integrated value characteristic 204 obtained by integrating the weak voltage value characteristic 202; thus, the distance x from the power transmission coil 11 to the power reception coil 12 can be detected with high robustness.

In this case, in the very-close-distance region Dc, the amount of increase of the weak voltage value vlpe (position increase amount) that increases monotonically in accordance with the increase of the moving amount xvp increases, and when the position of the power transmission coil 11 and the position of the power reception coil 12 coincide with each other in the plan view, the maximum value and the position increase amount become zero. Therefore, for example, by obtaining a point of inflection (position where the differential value changes from the positive value to zero) from the position differential value d(vlpe)/dx of the weak voltage value vlpe, the positioning can be performed more accurately, and the charging can be performed at the maximum transmission efficiency position. Accordingly, the charging efficiency can be optimized.

In this case, when the direction where the power reception coil 12 approaches the power transmission coil 11 is referred to as the approaching direction and the direction where the power reception coil 12 is separated from the power transmission coil 11 is referred to as the separation direction, the ECU 60 is configured to determine whether the direction of the power reception unit 12 is the approaching direction or the separation direction depending on the position differential value d(vlpe)/dx of the weak voltage value vlpe in the region (very-close-distance region Dc of the power transmission coil 11 where the weak voltage value vlpe monotonically increases as the moving amount xvp increases) where the weak voltage value vlpe is more than or equal to the weak voltage value (threshold) vlpec (predetermined voltage value), and determine whether the direction is the approaching direction or the separation direction depending on the position differential value d(vilpe)/dx of the weak voltage integrated value vilpe in the region (separation distance region Ds that is farther than the very-close-distance region Dc and that includes the region where the weak voltage value vlpe does not increase monotonically although the moving amount xvp increases) where the weak voltage value vlpe is less than the weak voltage value (threshold) vlpec (predetermined voltage value).

Thus, whether the power reception coil 12 moves to the approaching direction toward (direction to get close to) the power transmission coil 11 or to the separation direction (direction to go away) can be determined certainly. Therefore, for example, it is possible to prevent the power transmission coil 11 and the power reception coil 12 from being displayed inversely in the in-vehicle display unit 72.

The ECU 60 further includes the display unit 72 to serve as the notification unit configured to set the optimum vehicle speed (target vehicle speed Vvtar) to position the power reception coil 12 at the power transmission coil 11, and notify the occupant of the optimum vehicle speed (target vehicle speed Vvtar) or the order related to the vehicle speed Vvtar.

In this manner, the driver's operation of the accelerator pedal 77 for positioning can be appropriately assisted.

In particular, the vehicle 20 includes the display unit 72, and the ECU 60 is configured to cause the display unit 72 to display the target accelerator pedal opening θatar to achieve the optimum vehicle speed Vv and the current accelerator pedal opening θap, as the order related to the vehicle speed Vv.

In this manner, by displaying the target accelerator pedal opening θatar and the current accelerator pedal opening θap at the same time in the display unit 72, the driver's operation of the accelerator pedal 77 for positioning can be assisted more specifically so that the driver can easily understand.

The ECU 60 includes the steering angle sensor 78 configured to detect the steering angle θs of the vehicle 20, and the ECU 60 is configured to cause the display unit 72 to display the steering operating direction of the vehicle 20 on the basis of the detected steering angle θs and the position of the power reception coil 12 relative to the power transmission coil 11.

By displaying the steering operating direction of the vehicle 20 in the display unit 72, the driver's steering operation for positioning can be assisted more specifically so that the driver can easily understand.

[Modification]

In the non-contact power transmission system 10 according to the aforementioned embodiment, the vehicle 20 having received the weak power for positioning that is transmitted from the charging station 30 or the driver of the vehicle 20 performs the positioning of the vehicle 20 at the charging station 30 on the basis of the weak power. However, the present invention is not limited to this example, and the charging station 30 having received the weak power for positioning that is transmitted from the vehicle 20 may cause the vehicle 20 or the driver of the vehicle 20 to perform the positioning of the vehicle 20 at the charging station 30 on the basis of the weak power while communicating with the vehicle 20.

In this case, in the vehicle 20, the coil for transmitting the weak power and the coil for the main charging may be formed as one coil or formed separately. In the charging station 30, the coil for receiving the weak power and the power transmission coil 11 may be formed as one coil or formed separately. The ECU 60 of the vehicle 20 and the power source ECU 61 of the charging station 30 communicate to, for example, transmit the information from the charging station 30 to the vehicle 20 side during positioning, so as to perform the positioning process in cooperation.

That is to say, in this modification, the non-contact power transmission system includes the vehicle including the power transmission unit (power transmission coil) that transmits weak power for positioning, and the charging station including the power reception unit (power reception coil) that receives the weak power without contact.

The control unit of the charging station according to this modification includes the voltage value detection unit that detects the weak voltage value corresponding to the amount of the weak power received in the power reception unit, the moving amount detection unit that detects the moving amount of the vehicle, and the moving direction detection unit that detects the moving direction of the vehicle, wherein the position of the power reception unit relative to the power transmission coil is detected on the basis of the weak voltage value, the moving amount, and the moving direction that are detected.

According to this modification, the distance from the power reception unit to the power transmission coil is detected on the basis of the detected weak voltage value, and moreover the moving amount is detected on the basis of the change in level of the detected weak voltage value and furthermore, the moving direction is detected. Thus, the position (distance) of the power reception unit relative to the power transmission coil can be detected accurately.

The present invention is not limited to the above embodiments and various structures can be employed based on the description of the present specification.

What is claimed is:

1. A non-contact power transmission system comprising a charging station including a power transmission unit configured to transmit a weak power, and a vehicle including a power reception unit configured to receive the weak power without contact, the vehicle comprising a memory and a central processing unit, the central processing unit:
   detects a weak voltage value of the weak power received by the power reception unit;
   detects a moving amount of the vehicle;
   detects a moving direction of the vehicle; and
   calculates a weak voltage integrated value corresponding to an integrated value of the weak voltage value that is detected,
   wherein a weak voltage integrated value characteristic expressing a correspondence relation between the weak voltage integrated value and a distance from the power transmission unit to the power reception unit is stored in the memory in advance, and
   the central processing unit further
   sets a position at which the weak voltage value that is detected or the integrated value of the weak voltage value that is detected has increased from zero to an initial position of the power reception unit;
   calculates a position of the power reception unit by calculating the distance from the initial position on a basis of the moving amount and the moving direction; and
   detects a distance between the position of the power reception unit and the power transmission unit with reference to the weak voltage integrated value characteristic.

2. The non-contact power transmission system according to claim 1, the control unit of the vehicle further comprising:

a significance determination unit configured to determine whether the weak voltage value detected by the voltage value detection unit is significant; and
an initial position/parameter setting unit, wherein:
when the voltage value detected by the voltage value detection unit has increased from zero while the vehicle travels toward the power transmission unit in order to detect the weak power, the significance determination unit is configured to determine that the weak voltage value is significant; and
the initial position/parameter setting unit is configured to set a position at which it is determined that the weak voltage value is significant as an initial position of the power reception unit, and reset a parameter.

3. The non-contact power transmission system according to claim 2, the control unit further comprising a voltage value characteristic storage unit configured to store in advance a weak voltage value characteristic expressing a correspondence relation between the weak voltage value and a distance from the power transmission unit to the power reception unit,
wherein the moving amount detection unit is configured to detect the distance from the power transmission unit to the power reception unit by detecting the moving amount from the initial position to the power reception unit with reference to the weak voltage value characteristic using the weak voltage value detected by the voltage value detection unit as an argument.

4. The non-contact power transmission system according to claim 3, the control unit further comprising:
a weak voltage integrated value calculation unit configured to calculate a weak voltage integrated value corresponding to an integrated value of the weak voltage value that is detected; and
a voltage integrated value characteristic storage unit configured to store in advance a weak voltage integrated value characteristic expressing a correspondence relation between the weak voltage integrated value and the distance from the power transmission unit to the power reception unit,
wherein the distance from the power transmission unit to the power reception unit is detected by detecting the moving amount from the initial position with reference to the weak voltage integrated value characteristic.

5. The non-contact power transmission system according to claim 1, the control unit of the vehicle further comprising:
a significance determination unit configured to determine whether the weak voltage value detected by the voltage value detection unit is significant;
an initial position determining differentiation unit configured to obtain a differential value of the weak voltage value detected by the voltage value detection unit; and
an initial position/parameter setting unit, wherein:
the significance determination unit is configured to determine that the weak voltage value is significant when a differential value of the voltage value detected by the voltage value detection unit, which is obtained by the initial position determining differentiation unit, has increased from zero while the vehicle travels toward the power transmission unit in order to detect the weak power; and
the initial position/parameter setting unit is configured to set a position at which it is determined that the weak voltage value is significant as an initial position of the power reception unit, and reset a parameter.

6. The non-contact power transmission system according to claim 1,
a weak voltage value characteristic expressing a correspondence relation between the weak voltage value and the distance from the power transmission unit to the power reception unit is stored in the memory in advance,
wherein in a very-close-distance region of the power transmission unit where the weak voltage value increases as the moving amount increases, the distance from the power transmission unit to the position of the power reception unit is calculated with reference to the weak voltage value characteristic, and in a separation distance region that is farther than the very-close-distance region and that includes a region where the weak voltage value does not increase although the moving amount increases, the distance from the power transmission unit to the position of the power reception unit is calculated with reference to the weak voltage integrated value characteristic.

7. The non-contact power transmission system according to claim 1, wherein when a direction where the power reception unit approaches the power transmission unit is referred to as an approaching direction and a direction where the power reception unit is separated from the power transmission unit is referred to as a separation direction, the central processing unit is configured to determine whether a direction of the power reception unit is the approaching direction or the separation direction depending on a position differential value of the weak voltage value in a region where the weak voltage value is more than or equal to a predetermined voltage value, and determine whether the direction is the approaching direction or the separation direction depending on the weak voltage integrated value in a region where the weak voltage value is less than the predetermined voltage value.

8. The non-contact power transmission system according to claim 1, wherein the vehicle comprises a display unit and the central processing unit further comprising a notification unit configured to set an optimum vehicle speed to position the power reception unit at the power transmission unit, and notify an occupant of the optimum vehicle speed or an order related to the vehicle speed using the display unit.

9. The non-contact power transmission system according to claim 8,
wherein the central processing unit is configured to cause the display unit to display a target accelerator pedal opening to achieve the optimum vehicle speed and a current accelerator pedal opening, as the order related to the vehicle speed.

10. The non-contact power transmission system according to claim 9, wherein the vehicle comprises a steering angle detection sensor configured to detect a steering angle of the vehicle,
wherein the central processing unit is configured to cause the display unit to display a steering operating direction of the vehicle on a basis of the detected steering angle and a position of the power reception unit relative to the power transmission unit.

* * * * *